US009771781B2

(12) United States Patent
Enis et al.

(10) Patent No.: US 9,771,781 B2
(45) Date of Patent: Sep. 26, 2017

(54) METHOD AND APPARATUS FOR USING FROZEN CARBON DIOXIDE BLOCKS OR CYLINDERS TO RECOVER OIL FROM ABANDONED OIL WELLS

(71) Applicants: Ben M. Enis, Henderson, NV (US); Paul Lieberman, Torrance, CA (US)

(72) Inventors: Ben M. Enis, Henderson, NV (US); Paul Lieberman, Torrance, CA (US)

( * ) Notice: Subject to any disclaimer, the term of this patent is extended or adjusted under 35 U.S.C. 154(b) by 131 days.

(21) Appl. No.: 14/671,424

(22) Filed: Mar. 27, 2015

(65) Prior Publication Data
US 2015/0260022 A1 Sep. 17, 2015

Related U.S. Application Data

(63) Continuation-in-part of application No. 12/321,689, filed on Jan. 23, 2009, now abandoned.
(Continued)

(51) Int. Cl.
*F25J 3/00* (2006.01)
*E21B 43/16* (2006.01)
(Continued)

(52) U.S. Cl.
CPC .............. *E21B 43/164* (2013.01); *B01D 7/02* (2013.01); *B01D 53/73* (2013.01); *E21B 34/06* (2013.01);
(Continued)

(58) Field of Classification Search
CPC .. F25J 1/007; F25J 1/0027; F25J 3/067; F25J 2210/70; F25J 2215/80;
(Continued)

(56) References Cited

U.S. PATENT DOCUMENTS 1,927,175 A 9/1933 Josephson
2,590,542 A 3/1952 Jones
(Continued)

OTHER PUBLICATIONS

Neil, Carbon Dioxide Enhanced Oil Recovery, Department of Energy brochure, 2010.
(Continued)

*Primary Examiner* — Frantz Jules
*Assistant Examiner* — Webeshet Mengesha
(74) *Attorney, Agent, or Firm* — Mu P.C.

(57) ABSTRACT

A method and apparatus for enhanced oil recovery comprising separating $CO_2$ gas from coal or flue emissions of a power plant, and flash freezing the $CO_2$ gas with super chilled air, to form frozen $CO_2$ ice blocks or cylinders, wherein the $CO_2$ blocks or cylinders can then be inserted into an abandoned oil well, and the $CO_2$ can be allowed to warm up and change phase to a gas, which enables the $CO_2$ gas to mix with the oil, and helps reduce the viscosity of the oil and allows it to flow more freely, so that it can be pumped out using conventional equipment. A first application comprises having top and bottom valves and the $CO_2$ blocks or cylinders being allowed to change phase to a gas while inside the injection pipe, to increase the pressure therein, such that, by opening the bottom valve, pressurized jets of $CO_2$ gas can be released into the oil, causing the oil to mix vigorously with the carbon dioxide gas, and reduce the viscosity thereof. A second application comprises allowing the $CO_2$ cylinders or blocks to drop into the oil itself, wherein the relatively warm oil causes the frozen $CO_2$ to change phase to a gas, which causes violent gas bubbles to form that vigorously mix with the oil, which helps reduce the viscosity of the oil so it flows more freely through the reservoir.

7 Claims, 17 Drawing Sheets

Related U.S. Application Data

(60) Provisional application No. 61/011,955, filed on Jan. 23, 2008, provisional application No. 61/195,418, filed on Oct. 7, 2008.

(51) Int. Cl.
| | | |
|---|---|---|
| *E21B 43/25* | (2006.01) | |
| *E21B 43/40* | (2006.01) | |
| *E21B 34/06* | (2006.01) | |
| *E21B 43/12* | (2006.01) | |
| *B01D 7/02* | (2006.01) | |
| *B01D 53/73* | (2006.01) | |
| *B01D 53/14* | (2006.01) | |

(52) U.S. Cl.
CPC .......... *E21B 43/121* (2013.01); *E21B 43/255* (2013.01); *E21B 43/40* (2013.01); *B01D 53/1475* (2013.01); *B01D 2252/20484* (2013.01); *B01D 2252/20489* (2013.01); *B01D 2257/504* (2013.01); *B01D 2258/0283* (2013.01); *Y02P 70/34* (2015.11)

(58) Field of Classification Search
CPC F25J 2220/80–2220/84; F25J 2260/80; Y02C 10/04; Y02C 10/06; Y02C 10/00; Y02C 10/02; Y02C 10/08; Y02C 10/10; Y02C 10/12; Y02C 10/14; C01B 31/22; F23J 15/02; E21B 43/24; E21B 43/164; E21B 43/166
See application file for complete search history.

(56) References Cited

U.S. PATENT DOCUMENTS

| | | | | |
|---|---|---|---|---|
| 3,124,442 A | * | 3/1964 | Rich | B01F 3/04007 62/1 |
| 3,386,511 A | * | 6/1968 | Messina | E21B 43/24 166/300 |
| 3,717,286 A | | 2/1973 | Crider | |
| 3,901,044 A | * | 8/1975 | Vahl | C01B 31/22 62/605 |
| 5,724,805 A | * | 3/1998 | Golomb | F01K 23/106 60/39.12 |
| 6,412,559 B1 | | 7/2002 | Gunter et al. | |

OTHER PUBLICATIONS

Touray, Effect of Water Alternating Gas Injection on Ultimate Oil Recovery, Masters of Engineering project, Dalhousie University, 2013.
Bennion and Thomas, The Use of Carbon Dioxide as an Enhanced Recovery Agent for Increasing Heavy Oil Production, Hycal Energy Research Laboratories Ltd., Joint Canada/Romania Heavy Oil Symposium, 1993.
Zheng, Utilization of CO2 for Pressure Maintenance and Improving Oil Recovery in Heavy Oil Reservoirs, Master of Applied Science degree project, University of Regina, Canada, 2012.
David and Herzog, The Cost of Carbon Capture, Massachusetts Institute of Technology, Cambridge, MA, after 2000.
Arthur, Bohm, Layne, Cornue, Hydraulic Fracturing Considerations for Natural Gas Wells of the Marcellus Shale, Ground Water Protection Council, 2008 Annual Forum, Cincinnati, Ohio, 2008.

* cited by examiner

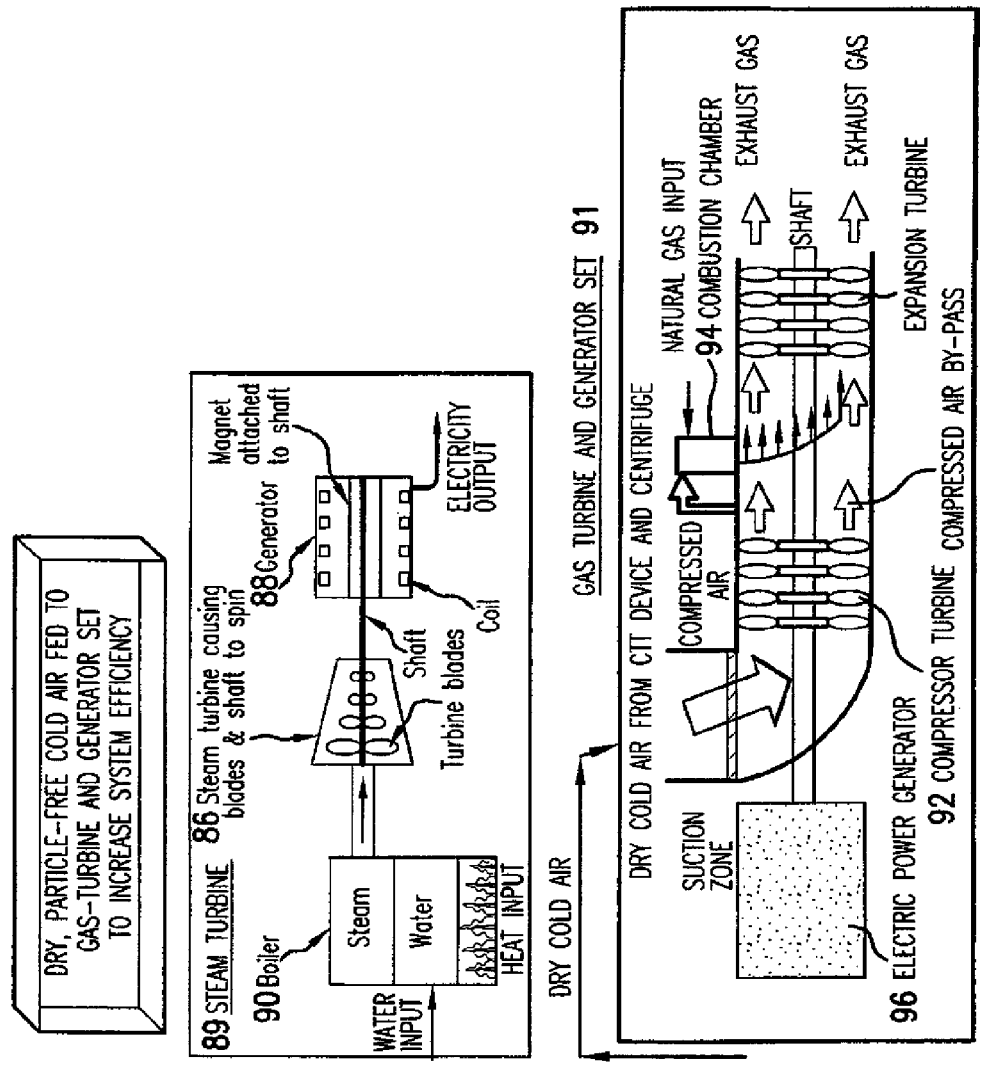
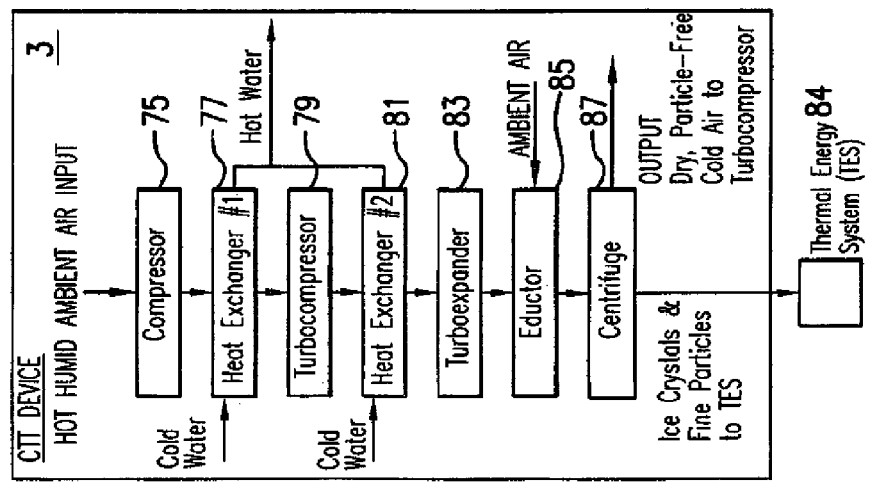
FIG. 5

|  |  |  | 487.67 pounds/sec air |  |  | 0.948 (BTU/sec)/kW |  |
|---|---|---|---|---|---|---|---|
| PRESSURE | TEMPERATURE | DENSITY | ENTHALPY | ENTROPY | POWER |  | EFFICIENCY |
| P | T | RHO | H | S |  |  |  |
| PSIA | F | #/CU FT | BTU/# | BTU/(# F) | kW |  |  |
| COMPRESSOR |
| 14.67 | 70 | 0.074764 | 126.71 | 1.6366 |  |  |  |
| 50 | 291.33 | 0.17951 | 180.06 | 1.6366 | 27,444 | COMPRESSOR RATING |  |
|  |  |  | 172.0575 |  |  |  | 85% |
| 50 | 258.43 | 0.18777 | 172.06 | 1.6257 | -4,115 | COMPRESSOR FRICTION LOSS |  |
| HEAT EXCHANGER #1 |
|  |  |  |  |  | -23,458 | MAXIMUM TRANSFER TO COOLANT |  |
| 50 | 70 | 0.25504 | 126.46 | 1.5521 |  |  |  |
| TURBOCOMPRESSOR |
| 215 | 302.79 | 0.75806 | 182.39 | 1.5394 | 28,772 | TURBOCOMPRESSOR RATING |  |
|  |  |  | 174.0005 |  | -4,316 | TURBOCOMPRESSOR FRICTION LOSS | 85% |
| 215 | 268.58 | 0.7941 | 174 | 1.5281 |  |  |  |
| HEAT EXCHANGER #2 |
| 215 | 70 | 1.1005 | 125.32 | 1.4501 | -25,042 | MAXIMUM TRANSFER TO COOLANT |  |
| TURBOEXPANDER |
| 30 | -159.57 | 0.27225 | 71.163 | 1.4501 | -27,859 | TURBOEXPANDER RATING |  |
|  |  |  | 79.28655 |  | -4,179 | TURBOEXPANDER FRICTION LOSS | 85% |
| 30 | -126.1 | 0.24426 | 79.287 | 1.4758 |  |  |  |

85%

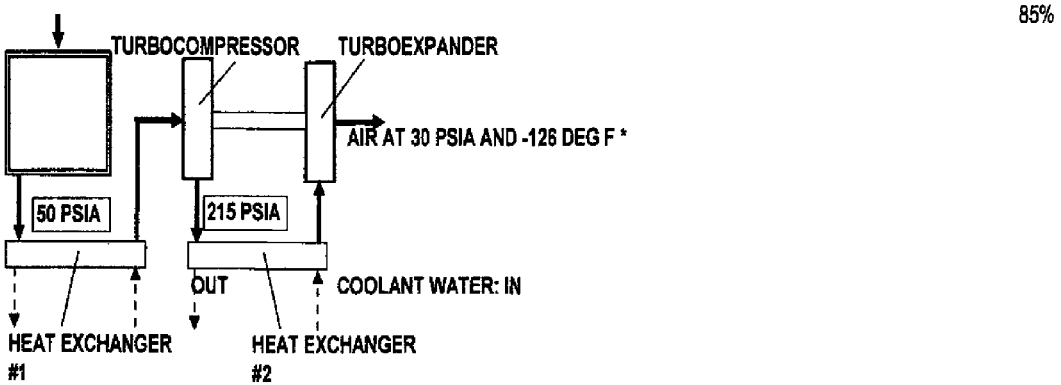

* SYSTEM CAN BE DESIGNED TO
DISCHARGE AIR AT 14.67 PSIA AND -180 DEG F

HEAT BALANCE FOR MATCHING FLUE OUTPUT OF "CO2 FREEZING" OUTPUT TO TURBOEXPANDER OUTPUT

Bituminous Coal Heat Release
    13,100 BTU/LB
Coal Consumption in Power Plant
    100 MW
    100,000 kW
      0.948 (BTU/SEC)/kW
    94,800 BTU/SEC
        7.24 LB/SEC coal consumption
Ideal Chemical Reaction

$$C + O_2 + 3.76\, N_2 \longrightarrow CO_2 + 3.762\, N_2$$

12 LBS carbon consumed
        44 LBS carbon dioxide generated
        3.67 LBS carbon dioxide generated per pound of carbon
      26.53 LBS/SEC carbon dioxide generated in 100 MW plant

Chilling of CO2 gas to solid
        70 deg F
      -109.3 deg F freezing point of CO2
        0.189 BTU/(LB deg F)
        246 BTU/LB heat of sublimation
      279.9 BTU/LB requried chilling
    7,426.6 BTU/SEC required chilling rate 
Turboexpander expansion requirments to match CO2 chilling rate
        86.34 BTU/# AIR REQUIRED BY COMPRESSOR
        0.00134 (kW/SCFM)/(BTU/#)
        0.115696 (kW/SCFM)
      10,213 kW REQUIRED BY COMPRESSOR
    385,000 SCFM
    6,416.67 SCFS
        0.076 LB/SCF
      487.67 LB/SEC -173 deg F exhaust temperature of air from turboexpander
      -109.3 F freezing temperture of CO2
        0.24 BTU/(LB deg F)
      487.67 LB/SEC chilled air
    7,455.4 BTU/SEC available chilling rate

| | |
|---|---|
| 14 | CO2 PIPES |
| 230.7 CU FT/SEC | CO2 TOTAL FLOW |
| 16.5 CU FT/SEC | CO2 FLOW PER PIPE |
| 20 FT/SEC | CO2 FLOW VELOCITY PER PIPE |
| 0.82 SQ FT | CO2 FLOW AREA PER PIPE |
| 1.0 FT | DIAMETER PER PIPE |
| | |
| 6 | AIR PIPES |
| 5,377 CU FT/SEC | AIR INFLOW |
| 896 CU FT/SEC | AIR INFLOW PER PIPE |
| 10 FT/SEC | AIR FLOW VELOCITY PER PIPE |
| 89.61 SQ FT | AIR FLOW AREA PER PIPE |
| 10.7 FT | DIAMETER PER PIPE |
| | |
| 1 | AIR PIPES |
| 5,377 CU FT/SEC | AIR OUTFLOW |
| 5,377 CU FT/SEC | AIR OUTFLOW |
| 20 FT/SEC | AIR FLOW VELOCITY PER PIPE |
| 268.84 SQ FT | AIR OUTFLOW AREA |
| 18.5 FT | DIAMETER OUTFLOW PIPE |

FIGURE 11

| | |
|---|---|
| 100 MW | POWERPLANT |
| 7.24 #/SEC | COAL CONSUMPTION |
| 26.53 #/SEC | CO2 |
| 0.115 #/CU FT | CO2 |
| 230.70 CU FT/SEC | CO2 |
| 487.67 #/SEC | AIR |
| 0.0907 #/CU FT | AIR at -173 F |
| 5,376.7 CU FT/SEC | AIR at -173 F |
| 5,607.4 CU FT/SEC | CO2 + AIR |
| 5 FT/SEC | DOWNWARD VELOCITY OF GASES |
| 1121.5 SQ FT | CROSS SECTION OF VAT |
| 36.5 FT | DEPTH OF RECTANGULAR CROSS-SECTION VAT |
| 36.4 FT | SCREW DIAMETER |
| 30.7 FT | WIDTH OF RECTANGULAR CROSS-SECTION VAT |
| 8 SEC | RESIDENCE TIME IN VAT |
| 40 FT | HEIGHT OF VAT |

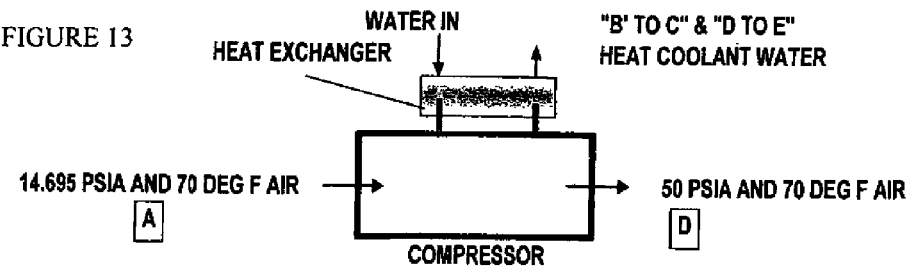

| STATE POINT | ABSOLUTE PRESSURE (psia) | TEMPERATURE (deg F) | DENSITY pound/cu ft | ENTHALPY BTU/pound | ENTROPY BTU/(pound- deg R) | EFFICIENCY | |
|---|---|---|---|---|---|---|---|
| A | 14.696 | 70 | 0.074897 | 126.71 | 1.6365 | | |
| B' | 50 | 291.03 | 0.17959 | 179.98 | 1.6365 | | |
| | | | | 10.654 | | | TO COOLANT WATER |
| B' TO C | | | | 169.326 | | 80% | |
| C | 50 | 247.18 | 0.19076 | 169.33 | 1.6219 | | |
| | | | | 42.87 | | | HEAT EXCHANGER C |
| D | 50 | 70 | 0.25504 | 126.46 | 1.5521 | | |

| STATE POINT | ABSOLUTE PRESSURE (psia) | TEMPERATURE (deg F) | DENSITY pound/cu ft | ENTHALPY BTU/pound | ENTROPY BTU/(pound- deg R) | EFFICIENCY | |
|---|---|---|---|---|---|---|---|
| 1 | 50 | 70 | 0.25504 | 126.46 | 1.5521 | | |
| 2 | 135 | 243.93 | 0.5169 | 168.24 | 1.5521 | 0.17366 | 35.51 BTU/POUND DIFF. |
| | | | | 6.267 | | | TO T/C COOLANT WATER |
| | | | | 161.973 | | 85% | |
| 2 | 135 | 218.24 | 0.53671 | 161.97 | 1.543 | | |
| | | | | 36.1 | | | TO HEAT EXCHANGER |
| 3 | 135 | 70 | 0.68991 | 125.87 | 1.4829 | | |
| 4' | 220 | 149.77 | 0.97426 | 144.87 | 1.4829 | | 16.15 BTU/POUND DIFF. |
| | | | | 2.85 | | | |
| | | | | 142.02 | | 85% | |
| 4 | 220 | 138.12 | 0.99376 | 142.02 | 1.4782 | | |
| | | | | 16.73 | | | TO HEAT EXCHANGER |
| 5 | 220 | 70 | 1.1262 | 125.29 | 1.4484 | | |
| 6' | 55 | -104.78 | 0.42219 | 84.07 | 1.4484 | | |
| | | | | -6.183 | | | -35.037 BTU/POUND DIFF. |
| | | | | 90.253 | | 85% | |
| 6 | 55 | -79.383 | 0.39315 | 90.253 | 1.4652 | | |
| 7' | 24 | -160.18 | 0.21785 | 71.137 | 1.4652 | | -16.2486 BTU/POUND DIFF. |
| | | | | -2.8674 | | | |
| | | | | 74.0044 | | 85% | |
| 7 | 24 | -148.35 | 0.20938 | 74.004 | 1.4746 | | |

FIGURE 14

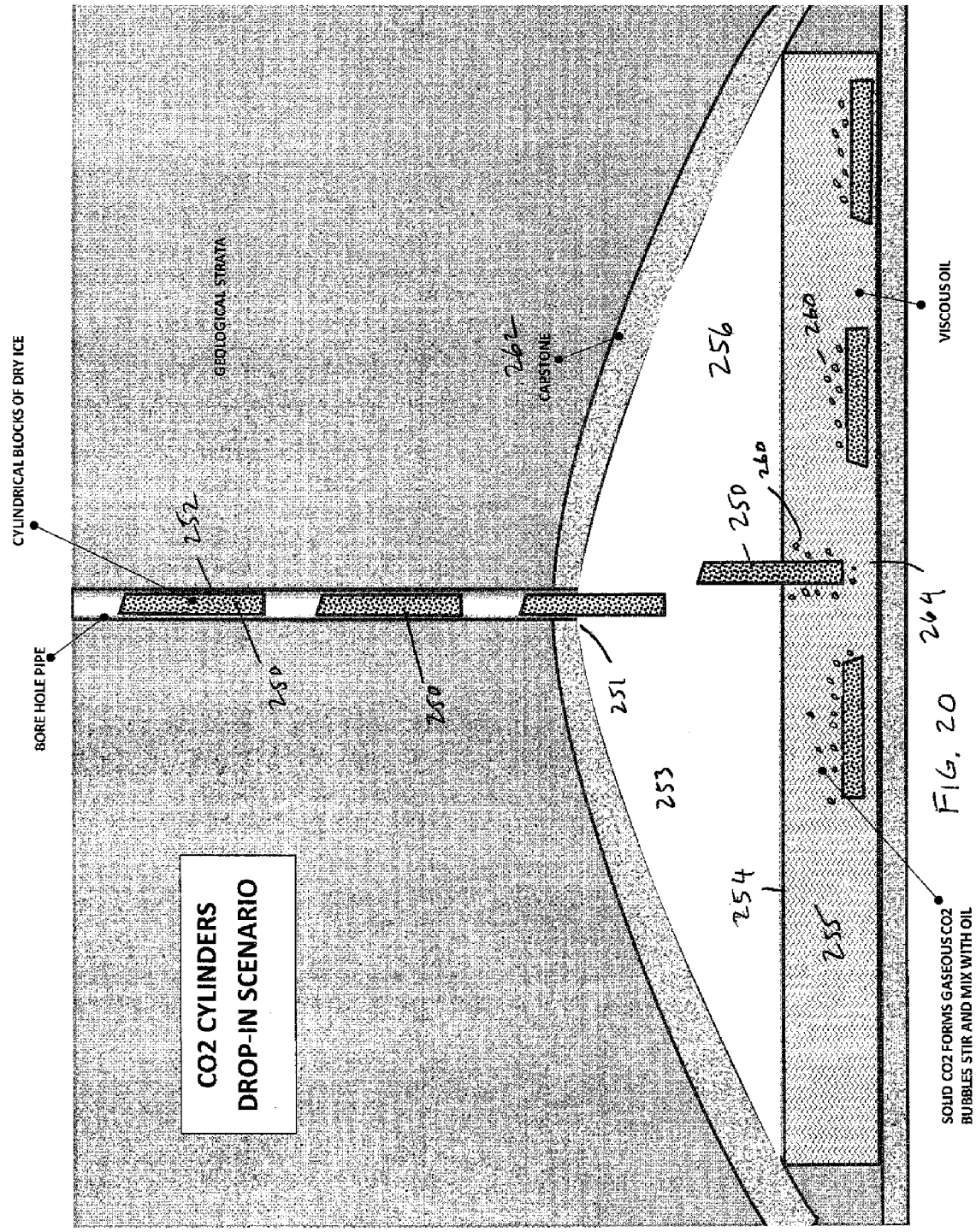

METHOD AND APPARATUS FOR USING FROZEN CARBON DIOXIDE BLOCKS OR CYLINDERS TO RECOVER OIL FROM ABANDONED OIL WELLS

RELATED APPLICATIONS

This is a continuation in part of U.S. application Ser. No. 12/321,689, filed Jan. 23, 2009, which claims priority from U.S. Provisional Application Ser. Nos. 61/011,955, filed Jan. 23, 2008, and 61/195,418, filed Oct. 7, 2008.

FIELD OF THE INVENTION

The invention relates to the field of enhanced oil recovery, and in particular, to a method and apparatus for recovering oil from abandoned oil wells, such as in cases when the oil is too viscous to be extracted using conventional pumping equipment.

BACKGROUND OF THE INVENTION

Hydraulic fracturing is a process that creates fractures in rock formations (or reservoirs), which has the effect of increasing the output of a well. The most important industrial use of this process is for stimulating oil and gas wells.

Hydraulic fracturing helps remove natural gas and oil from rock formations deep within the earth's crust where there are insufficient porosity and permeability levels to allow these resources to flow from the reservoir to the wellbore at economic rates. Man-made fractures are normally extended into targeted rock formations and are typically created using wellbores drilled into the formations to enhance oil and natural gas recovery, such as from coal beds and shale rock, etc. In such case, the fractures preferably provide a conduit or path that connects the reservoir to the well, thereby increasing the area from which natural gas and oil can be recovered.

While "fracking," as this technology has been termed, has increased oil and gas production, the environmental questions and concerns associated with fracking have continued. These concerns include contamination of ground water, risks to air quality, the migration of gasses and chemicals to the surface, the creation of seismic events, and the potential mishandling of waste. The potential costs associated with environmental clean-up, loss of land value, and human and animal health concerns are still being investigated and evaluated.

At the same time, it is clear that fracking has already significantly increased the output of oil and gas here in the United States. And with a significant number of new oil exploration efforts being made, especially on private land, over the last few years, the energy industry has not only seen the discovery of many new supplies being developed, but also a significant increase in the supply of oil and gas for commercial use.

Notwithstanding this success, the use of these technologies and the exuberant exploitation of these natural resources, has also led to some unintended consequences which haven't necessarily good for the energy industry. For one thing, it is believed that the over-supply of oil in this country resulting from increased fracking has led to a dramatic drop in oil prices throughout the world, i.e., the price of crude oil has dropped from over $100 per barrel to under $45 per barrel in less than six months, which has affected the global economy. Although some experts suggest that this has been caused in part by the slow-down in the overall global economy, which has led to less demand for oil throughout the world, many experts believe that had the supply of oil not been so dramatically increased by fracking here in the U.S., the price of crude oil would not have dropped so dramatically.

And because of this drop, many energy companies are now seeing their profits and margins slashed significantly, and in many cases, they are incurring huge losses and experiencing many shut-downs and lay-offs, and even facing bankruptcies, which is threatening to derail the new "energy renaissance" here in the U.S.

While existing oil wells and reservoirs are continuing to operate, and many of them are still thriving by producing significant amounts of oil, under these economic conditions, the potential for new explorations and new investments being made, along with new resources being found and exploited, have significantly been reduced. Without the increased margins and profits derived from higher oil and gas prices necessary to make these exploration and investment efforts worthwhile, many companies are now scaling back their operations and even terminating the many new projects and project development efforts they had in their pipeline.

At the same time, a number of oil wells have been abandoned over the last several years, which is due in part to a number of factors, including 1) the additional availability of new and more efficient resources including oil wells that have gone on-line, which have provided increased output at higher rates, making their efforts more profitable, 2) over time, as is the case with any existing oil reservoir, there is a tendency for the production levels and profitability rates to drop, as the accessible supply of oil gradually becomes depleted, and 3) the reduction in the ability of energy production companies to extract all of the remaining oil in an existing reservoir, due to the fact that over time the oil remaining near the bottom of the reservoir is thicker and more viscous and therefore more difficult to pump using conventional equipment. As a result of these issues, many energy companies are abandoning existing oil wells and reservoirs in favor of seeking newer and richer supplies and resources.

Under these circumstances, and with oil prices and therefore profits and margins being dramatically reduced, a need currently exists to find a cost-effective way to enhance the recovery of oil remaining in abandoned oil wells that exist across this country, as a means of augmenting the supply of oil coming from new oil reservoirs that are currently being exploited and developed. One advantage to recovering oil from an abandoned oil well, rather than exploiting new resources, is that with an existing reservoir no new land-use permits or environmental impact studies have to be performed and obtained. This enables the recovery of oil from these existing sites and resources to be less costly, and involve less upfront capital and fewer investments and risks, etc., as well as reduce the long term impact on the environment.

As further background, a typical oil well normally goes through several phases. In the beginning, when a new oil field is discovered and production wells are initially drilled into a geological formation, the phase it goes through is typically called the "primary production" phase, wherein oil is pumped and produced using the pent-up energy of fluids found in the reservoir. Then, at the end of primary production, in many cases, a considerable amount of oil can be left behind, with sometimes as much as 80 to 90 percent of the total amount of oil being "trapped" in the pore spaces of the reservoir. And depending on how productive a certain oil well has been in the past, and the cost of trying to extract the remaining oil versus the cost of exploiting a new site, energy companies have often chosen to abandon these reservoirs.

On the other hand, if an energy company desires to try to extract the remaining oil from the existing reservoir, and they do not abandon the site after primary production phase, they can move into what is called the "secondary production" phase, wherein a substance (usually water) is injected into the existing reservoir to pressurize the oil which allows the remaining oil in the reservoir to be more easily recovered. In such case, the injection of fluid helps to increase air pressure inside the reservoir, which helps to push and ultimately sweep the oil toward the recovery wells, i.e., either through new recovery pipes that are drilled into the formation for this purpose or through the original injection pipe that can be converted into a recovery pipe. This secondary production phase often yields up to an equal or greater amount of oil when compared to the amount recovered using primary production methods.

After both primary and secondary production efforts have been used, in many cases, as much as 50 to 70 percent of the total amount of oil existing in a reservoir can still be left behind. This is because much of the oil in the reservoir is either bypassed by the injected fluid (since oil does not mix well with the water) or the remaining oil (particularly near the bottom) is often too thick or viscous and therefore too difficult to recover using conventional pumping equipment.

One current practice that has seen some marginal success in the industry is the use of enhanced oil recovery methods, often called "Tertiary Production" methods, as a means of recovering oil from abandoned oil wells, which is typically used after both the first and secondary production phases have already been performed. These tertiary methods can include the injection of carbon dioxide gas into the existing oil wells, which causes the gas to react with the remaining oil, which in turn, helps to change the oil's properties, which then allows it to flow more freely toward the recovery pipes. In this respect, it has been found that when nearly pure carbon dioxide gas (that consists of greater than 95 percent of its overall composition) is mixed with oil, it has sufficient properties to cause the oil to swell, and become lighter, and in turn, less viscous, such that it will not only flow more easily through the reservoir, but also detach itself from the rock surfaces, which allows the oil to be pumped out using conventional equipment.

At the same time, it has been found that only about 4 to 15 percent of the remaining oil in a typical reservoir can be recovered using these tertiary methods, and therefore, this method has not always been viewed as being cost-effective to implement. Therefore, many existing oil wells are still being abandoned even though a significant amount of oil is left behind and remains in these existing reservoirs.

For all of the above reasons, a current need exists to develop cost-effective technologies for increasing the recovery of oil from abandoned oil wells, and in particular, in cases where the remaining oil in the reservoir is too viscous to pump out using conventional pumping equipment. There is also a need to develop improved technologies that will avoid harming the environment, such as the use of chemicals and the production of waste materials, etc.

SUMMARY OF THE INVENTION

The present invention relates to a method and apparatus for recovering oil from an existing oil well, such as those that have been abandoned because the oil remaining in the reservoir is too viscous to be pumped out using conventional pumping equipment. It preferably uses $CO_2$ gas separated from coal or flue emissions of a power plant and a compressor and expander (compander) device to produce super chilled air that can be mixed in a chamber with the $CO_2$ gas to produce frozen carbon dioxide ice crystals, which are preferably agglomerated to form frozen blocks or cylinders, which can then be transported to the existing site and dropped into an existing injection pipe and down into the abandoned underground oil reservoir.

At this point, there are two different applications for the use of these carbon dioxide blocks or cylinders. In the first application, the existing injection pipe is initially adapted and retrofitted with shutoff valves at the top and at the bottom, and used in situations where the injection pipe already extends down into the remaining oil itself, wherein multiple perforations near the bottom of the pipe can communicate directly with the oil in the reservoir. In such case, with the top valves open and the bottom valves closed, the frozen carbon dioxide blocks or cylinders are preferably inserted into the injection pipe, one by one, until they substantially fill the volume of space within the pipe, and then, after closing the top valves, the carbon dioxide within the pipe is allowed to warm up (due to the relatively warm temperatures surrounding the underground pipe), wherein eventually, the frozen carbon dioxide will change phase from a solid to a gas, which will cause the air pressure inside the pipe to be substantially increased.

Then, at the appropriate time, such as when the air pressure inside the pipe has reached a predetermined level, the bottom valves are preferably opened, wherein the pressurized carbon dioxide gas inside the pipe can be emitted through the openings at the bottom of the pipe and into the oil reservoir, wherein this causes the carbon dioxide gas to mix vigorously with the oil in the reservoir, which in turn, causes the oil to swell and become lighter, and therefore, less viscous, such that it can flow more freely through the reservoir, and detach itself from the rock formation. This way, the oil can be pumped out of the reservoir, such as through additional recovery pipes, using conventional pumping equipment. This method can also be used to inject carbon dioxide gas under pressure directly into an oil shale rock formation, wherein the pressurized gas can help break up the formation and create fractures therein through which fluids can flow more easily to the recovery pipes.

Also, as the remaining oil is pumped out and recovered at the surface, means are preferably provided to capture any excess carbon dioxide gas that may be released through the injection and/or recovery pipes, such that it will not be emitted into the atmosphere, which can cause environmental concerns. Preferably, in such case, a closed-loop system is created, wherein the carbon dioxide gas captured at the surface can be recycled and reused to create additional frozen carbon dioxide blocks or cylinders, wherein the cycle can then be repeated again and again.

In a second application, the injection pipe does not have to be adapted to have shutoff valves. Instead, it is preferably used when the level of the remaining oil in the existing underground oil reservoir falls below the bottom of the injection pipe, which can occur, for instance, after the primary and secondary production phases have been conducted, and before the tertiary phase has been applied, wherein the bottom of the existing pipe extends down only into the airspace of the reservoir, i.e., under the dome or capstone thereof, but above the surface level of the liquid oil in the reservoir.

In such case, the frozen carbon dioxide blocks or cylinders are preferably dropped into the injection pipe, one by one, and allowed to slide down through the pipe due to gravity alone, until they splash down into the liquid oil reservoir, which begins the process of mixing the carbon dioxide gas with the remaining oil in the reservoir. Because the oil in the reservoir is relatively warm compared to the temperature of the frozen carbon dioxide blocks or cylinders, the carbon dioxide will begin to melt and change phase directly from a solid to a gas, wherein violent gas bubbles begin to form in the oil, which causes the carbon dioxide gas to stir and mix vigorously with the oil. Again, this causes the oil to react with the carbon dioxide gas, which in turn, causes it to swell, and lighten, and become less viscous, so that it can flow more freely through the reservoir and detach itself from the rock formations, in which case, the remaining oil can be more easily pumped out using conventional equipment.

Note that as the gas bubbles form, the energy released from the bubbles will help propel the blocks or cylinders through the reservoir, which further enhances the stirring and mixing effect created by the emission of carbon dioxide gas into the oil. Then, as the frozen carbon dioxide blocks or cylinders begin to sink, due to their added density, carbon dioxide gas with continue to be emitted, which will cause the blocks or cylinders to continue to be propelled through the reservoir, wherein they will continue to bubble, stir and mix with the oil, until the frozen blocks or cylinders have completely sublimated, i.e., turned completely to a gas. By causing the blocks or cylinders to sink, while they are being propelled through the reservoir by the emission of gas bubbles, the breadth and scope of the effect created by the carbon dioxide gas changing phase from a solid to a gas can be enhanced.

The following discussion provides more specific descriptions of each step used in both applications:

For both the first and second applications, the first step preferably involves separating $CO_2$ gas from the flue emissions of a power plant or the coal used in the power plant, using one of several methods. In this respect, $CO_2$ gas can be captured and separated from the flue gases of a coal burning power plant, incinerator, or chemical processing plant, etc., using one of the following processes: 1) Chemical and physical absorption, 2) Solid physical adsorption-pressure swing and temperature swing adsorption, 3) Low temperature distillation (cryogenic separation); 4) Membrane separation, and 5) Contact with a solution. In one chemical absorption method, an MEA chemical absorber is preferably used to separate the $CO_2$ gas from the flue gases wherein the system comprises an absorber, a regenerating unit, a condenser, storage tank, and heat exchanger, etc. This system comprises amine based processes for the removal of acid gas impurities ($CO_2$ and $H_2S$), wherein alkanolamines (MEA, DEA, and MDEA) are used to remove $CO_2$ from the flue gas stream by the exothermic reaction of $CO_2$ with the amine functionality of the alkanolamine. An example of a membrane process is described in U.S. Pat. No. 6,572,680, which issued on Jun. 3, 2003, entitled "Carbon dioxide gas separation using organic-vapor-resistant membranes." An example of the contact solution process is described in U.S. Pat. No. 5,861,051, which issued on Jan. 19, 1999, entitled "Process for removing carbon dioxide from gas mixture."

The $CO_2$ gas is preferably separated and sequestered either before the coal is burned or afterwards, depending on the type of equipment used. Technologies that can be used for this purpose are disclosed in Applicants' related U.S. application Ser. No. 12/321,689, which was published on Aug. 20, 2009, as publication no. US20090205364, entitled "METHOD AND APPARATUS FOR REMOVING CARBON DIOXIDE GAS FROM COAL COMBUSTION POWER PLANTS," which is incorporated herein by reference, although many other methods and apparatuses for capturing $CO_2$ gas can be used.

Second, the captured $CO_2$ gas is preferably chilled to form frozen carbon dioxide crystals, such that they can agglomerate to form $CO_2$ ice blocks or cylinders that can be used to enhance oil recovery at abandoned oil wells. In the proposed solution, the $CO_2$ gas is preferably chilled and desublimated by interaction with super-chilled air in a mixing chamber to produce frozen carbon dioxide crystals which can then be agglomerated to form blocks or cylinders which can be easily transported and used. The super chilled air is preferably produced using a compressor that produces compressed air and an expander that releases the compressed air, wherein the super chilled air is produced as a by-product thereof. In such case, the super chilled air is preferably injected through multiple openings into the chamber, along with the carbon dioxide gas, wherein they preferably mix together in a dead air zone until the carbon dioxide gas begins to freeze and form ice crystals. Note that the carbon dioxide gas will freeze as long as it remains at equal to or less than minus 109.3 degrees F. This process eliminates the need to dig mines, use existing caverns, or to find algae deposits, or lime quarries, in which to store the $CO_2$, or build pipelines. Instead, $CO_2$ gas is frozen into solid dry ice which can then be delivered to the desired site—which in turn allows the system to offset the high costs associated with separating $CO_2$ as discussed, and to remove the $CO_2$ from being emitted into the atmosphere.

Third, the frozen carbon dioxide crystals are preferably collected at the bottom of the chamber and in one embodiment a screw is preferably provided and used to push the frozen crystals down through a portal and into a mold or other structure that helps form the shape of the blocks or cylinders. Alternatively, the chamber can be horizontally oriented and the pressure created by the carbon dioxide gas injected into the chamber can help push the frozen crystals sideways toward a mold or cartridge at the far end of the chamber, wherein as the crystals begin to agglomerate together at the far end, they can create the appropriately sized and shaped block or cylinder.

The size and shape of the blocks/cylinders and the mold/cartridge used to form them are preferably determined based on the size and shape of the existing injection pipe, and other circumstances affecting their use. Each mold or cartridge is preferably located on a wheel that allows them to rotate one after the other, so that they can be filled and refilled, etc. Cartridges that are removable from the wheel can also be used so that the frozen carbon dioxide cylinders can remain inside the cartridge while they are being transported to the site, which helps protect the cylinders.

Fourth, once the carbon dioxide ice blocks or cylinders are formed into the appropriate size and shape, they are preferably transported to the existing site, such as in a refrigerated truck or train car, and when they arrive on site, they are preferably lifted, such as by a crane, and dropped into the existing injection pipe, i.e., that leads down into the abandoned oil well. Note: When frozen carbon dioxide cylinders are used, they are preferably sized such that they are slightly smaller in diameter than the inside walls of the injection pipe, so that they can slide and free-fall down into the injection pipe and into the abandoned reservoir by gravity alone.

The next four steps describe the subsequent steps that are used to carry out the first application, which, as mentioned above, is suitable for use when the existing injection pipe extends down into the oil itself, wherein multiple perforations at the bottom of the pipe communicate directly with the oil in the reservoir.

First, the existing injection pipe is preferably evaluated and if necessary adapted and retrofitted with shutoff valves at the top and bottom.

Second, with the top valves open, and the bottom valves closed, the frozen carbon dioxide blocks or cylinders are inserted into the injection pipe, one by one, until the injection pipe is substantially filled. By substantially filling the pipe, the system can maximize the pressure inside the pipe and therefore the effectiveness of the system.

Third, after closing the top valves, i.e., once the pipe is sealed at the top and bottom, the frozen blocks or cylinders are allowed to warm up, due to the relatively warm temperatures found in the ground surrounding the underground pipe, wherein the carbon dioxide gas will begin to change phase from a solid to a gas, which will substantially increase the pressure of the air and carbon dioxide gas that exists inside the pipe, i.e., with both valves closed.

Fourth, at the appropriate time, such as when the pressure in the pipe reaches a predetermined level, i.e., up to 20,000 psi, the bottom valves are preferably opened, which causes the pressurized carbon dioxide gas inside the pipe to be emitted under high pressure and at high velocities into the oil reservoir, wherein this causes the carbon dioxide gas to mix vigorously with the remaining oil in the reservoir, which causes the oil to react with the carbon dioxide gas, which in turn, causes it to swell, and become lighter and less viscous, so that it can flow more freely through the reservoir and detach itself from the rock formation, which enables more of the remaining oil in the reservoir to be pumped out using conventional pumping equipment.

Fifth, if necessary, additional recovery pipes can be constructed and extended into the existing reservoir, which enables the remaining oil that flows through the reservoir to be pumped out toward the surface. Or, the injection pipe can be adapted and converted into a recovery pipe, wherein the lower viscous oil found in the reservoir can be drawn out, i.e., in a reverse direction, upward through the injection pipe and toward the surface where it can then be recovered.

Lastly, as the remaining oil is being pumped out and recovered at the surface, means are preferably provided to capture the carbon dioxide gas that is being released through the injection and/or recovery pipes, such that it will not be emitted into the atmosphere. In such case, a closed-loop system is preferably used, wherein the carbon dioxide gas captured at the surface can be recycled back and reused to create additional frozen carbon dioxide ice blocks/cylinders, wherein these steps can be repeated again and again.

Alternatively, this same technique can be used in connection with extracting oil from an existing solid oil shale rock formation, wherein the injection pipe is extended down into the solid rock formation. In such case, by opening the bottom valves, pressurized carbon dioxide gas can be released and emitted into the rock formation, wherein high pressure carbon dioxide gas jets can be used to perforate the rock, i.e., in several radial directions, to create fractures and long pencil-like cracks and fissures in the rock formation, which increases stresses found in the formation, which causes the shale to crack and crumble, so that the porosity and permeability of the rock formation is increased. Note that each crack, fracture or perforation is preferably long and has a sufficient diameter to enable oil found in and around the formation to flow and be released, wherein the oil can then be made less viscous by having it mix with the carbon dioxide gas. And with more porosity, more oil can be exposed to the carbon dioxide gas for mixing, wherein the result is that less viscous oil is able to quickly migrate to the recovery well via increased permeability.

The next four steps describe the second application, which can be used when the level of the oil in the reservoir falls below the bottom of the existing injection pipe. This can occur, for example, when the reservoir has already undergone the first and second production phases, and the level of the remaining oil in the reservoir drops below the bottom of the pipe, i.e., the injection pipe only extends into the airspace underneath the capstone or dome of the reservoir, but does not extend into the oil itself.

In the first step (of the second application), without having to adapt or retrofit the existing injection pipe, the frozen carbon dioxide cylinders are preferably dropped down into the injection pipe, such that they slide and free-fall all the way down to the reservoir by gravity alone. That way, when they reach the bottom, they will splash into the oil reservoir, thereby creating a liquid crater, which begins the process of mixing the carbon dioxide gas with the oil.

Second, as the warmer temperature of the oil within the reservoir causes the frozen blocks or cylinders to warm up and begin to sublimate, the frozen blocks or cylinders will begin to change phase from a solid to a gas, wherein violent gas bubbles will begin to form, which can help stir and mix the gas with the oil, which in turn, can cause the oil to swell, and lighten, and therefore, become less viscous.

Third, as the gas bubbles violently mix with the oil, the blocks/cylinders tend to be propelled through the oil in different directions, i.e., through the reservoir, which can increase the effectiveness of the process. That is, the emission of gas bubbles tends to cause the blocks/cylinders to move in and through the reservoir, and due to their density, they will also tend to sink toward the bottom, wherein they will continue to be warmed up the oil, and therefore, continue to bubble and emit gases that will continue to stir and mix with the oil. And, as the gas bubbles continue to form, and as the blocks/cylinders continue to sink, the oil will continue to react with the carbon dioxide gas, which occurs until all of the ice has completely sublimated and turned to a gas.

Fourth, like the first application, additional recovery pipes can be installed that can be extended down into the reservoir, which enables the lower viscous oil that flows through the reservoir to be pumped out, and/or, the injection pipe can be adapted and converted into a recovery pipe, such that the pump can be used to enable the oil to flow in a reverse direction, upward through the pipe, where it can be recovered and used.

Note that, depending on the circumstances, and whether the existing pipe extends into the oil itself, the first application can be used independently from the second application, and vice versa, or the second application can be applied following the use of the first application. For example, if the existing pipe extends into the remaining oil, the first application can be used independent of the second. Likewise, if the existing pipe doesn't extend into the remaining oil, the second application can be used independently of the first. At the same time, in some cases, there may be a reason to use the first application initially, such as when the existing pipe extends into the oil, but then, after the first application has been applied, and the level of the oil drops below the bottom of the pipe, the second application can be used, i.e., to reduce the viscosity of the remaining oil left in the reservoir.

In both applications, as the remaining oil is being pumped out and recovered at the surface, means are preferably provided to capture the carbon dioxide gas being released through the injection and/or recovery pipes, such that it will not be emitted into the atmosphere. In either application, the system is preferably provided with a closed-loop return system, wherein the carbon dioxide gas captured at the surface can be recycled back and reused to create additional frozen carbon dioxide ice blocks and/or cylinders, such that these same steps can be repeated again and again, such as until substantially all of the remaining oil or at least a significant amount, depending on the nature of the circumstances, in the reservoir has been recovered.

BRIEF DESCRIPTION OF THE DRAWINGS

FIG. 5 is a schematic drawing of the CTT device showing the various components and method steps for increasing the efficiency of a fuel driven turbine generator, including the steam turbine generator;

FIG. 9 is a chart showing the thermodynamic states for an example of the CTT device;

FIG. 10 is a chart showing the heat balance and air flow requirements for an example of the CTT device;

FIG. 11 is a chart showing the $CO_2$ and air duct sizes from the power plant for an example of the present system;

FIG. 12 is a chart showing the $CO_2$ and air duct sizes for the mixing duct for an example of the present system;

FIG. 13 is a chart showing the efficiency of the compressor for an example of the CTT device;

FIG. 14 is a chart showing the thermodynamic properties of two different CTT devices;

FIG. 20 is a schematic drawing showing an existing injection pipe extending down into an abandoned oil reservoir, wherein the level of the oil in the reservoir has dropped below the bottom end of the pipe, wherein the pipe only extends into the airspace below the capstone or dome, wherein, when the frozen carbon dioxide cylinders are dropped into the injection pipe, they will splash down into the liquid oil, wherein as the cylinders are warmed up by the warm oil, they will change phase from a solid to a gas, creating violent gas bubbles that will mix vigorously with the oil (this is referred to as the "second application").

DETAILED DESCRIPTION OF THE INVENTION

Figure 1A:
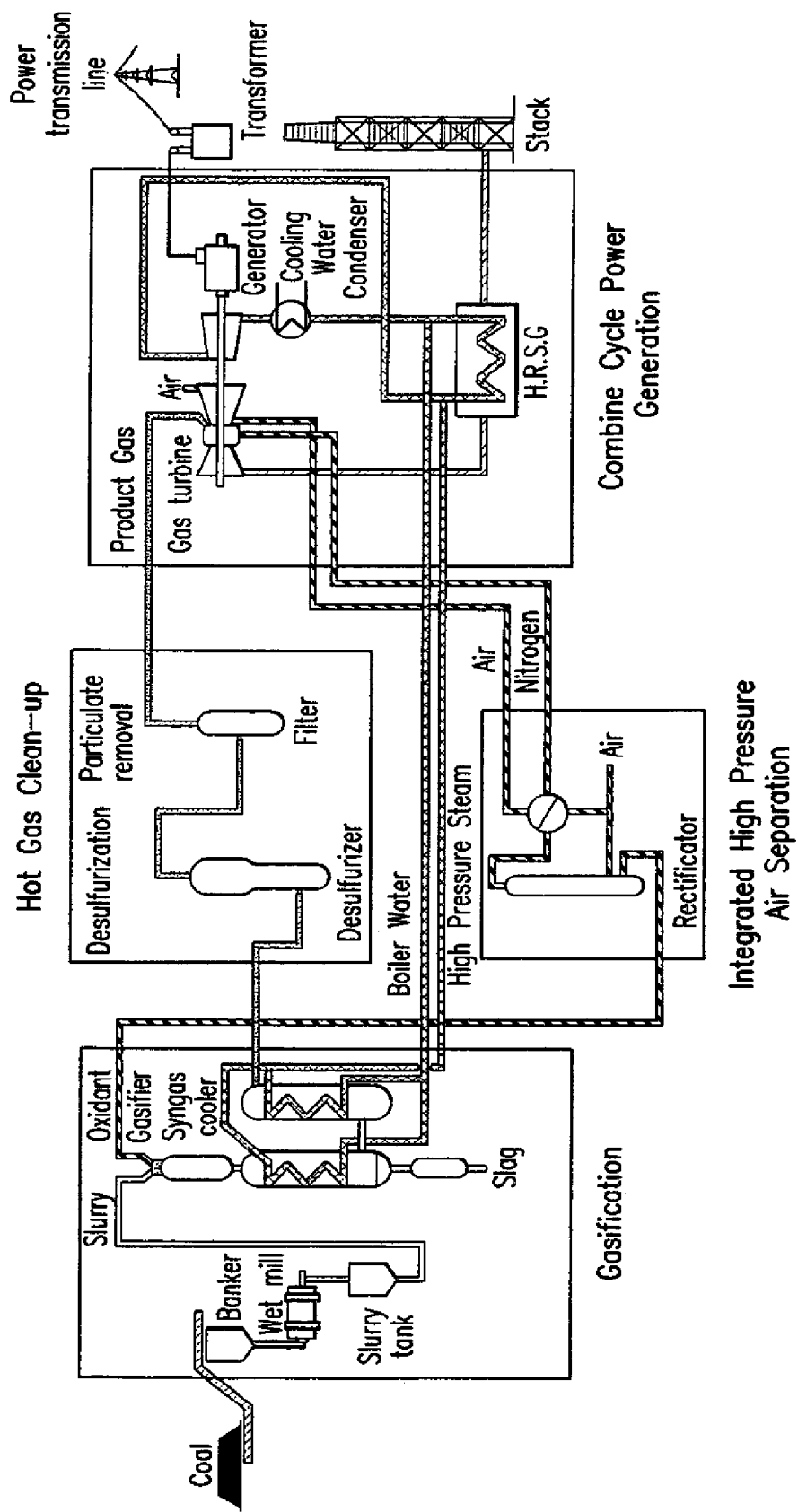
FIG. 1A is a schematic drawing showing various components and steps of an existing IGCC system for cleaning and separating CO and $CO_2$ gases from flue gases released from coal combustion power plants (HRSG=Heat Recovery Steam Generator)

One of the main contributors to global warming is believed to be the increase in carbon dioxide gas emitted into the earth's atmosphere by various man-made activities and technologies such as coal burning power plants. The main contributors to carbon dioxide emissions that can affect the earth's atmosphere and therefore increase global warming include solid fuels, such as coal, liquid fuels, such as gasoline, and gaseous fuels, such as natural gas. While there is strong motivation to use coal for the generation of energy due to its efficiency and abundance, there is also a strong interest in eliminating the undesired emission of carbon dioxide gas into the atmosphere which is caused by the combustion of coal in standard coal combustion power plants.

One existing technology used to eliminate excess carbon dioxide emissions involves "capturing" the $CO_2$ gas as it is being emitted from smokestacks, and storing it. The idea of carbon capture and storage (CCS)—first introduced in the 1970's—began by making use of existing underground reservoirs in which to store the $CO_2$ gas. It has been estimated that the available storage space in underground reservoirs is probably large enough to store all the carbon dioxide gas contained in all the remaining fossil fuel reserves throughout the world.

Recently, leading science and energy institutes advocated strongly for the further development of carbon capture and storage technology. For example, capturing $CO_2$ from smokestacks for the purification of natural gas or at ammonia production facilities is a practice that has existed for years. Moreover, injection and storage of carbon dioxide gas is already occurring in the North Sea, Algeria, and Texas.

While some of these technologies have gained credibility in recent years, many experts still believe that because of the rapid use of the world's remaining fossil fuel reserves, it is necessary to further lower the environmental impact caused by these technologies in an effort to prevent catastrophic climate changes in the future. The problem at hand is that the process of capturing, transporting and storing carbon dioxide gas from coal combustion power plants can dramatically raise energy consumption costs and cause serious health and environmental issues and concerns.

For example, if the energy used to capture $CO_2$ emissions is derived directly from the fossil fuels themselves, the benefits of capturing and storing the $CO_2$ will be offset by the very same energy intensive process. And, if the energy comes from renewable sources, the technology would be rendered unnecessary as it would be much more efficient to generate electricity directly from the renewable source.

Indeed, it has been discovered that capturing $CO_2$ from smokestacks and compressing it for transport can be one of the most energy-intensive aspects of the process. According to the International Panel of Climate Change (IPCC), which prepared a comprehensive study, capturing technology (including compression of the gas for further transport and storage) can raise the energy consumption of a coal combustion power plant by an average of 32 percent.

Capturing carbon dioxide in rocks also requires a significant infrastructure that is comparable to today's coal industry, which can also lead to significant amounts of industrial wastes and mining tailings—for example, fuel ash from coal plants. The process also generates large amounts of waste materials (apart from the carbonised rocks themselves), and for every ton of carbon dioxide stored in rock, 2.87 to 45.18 tons of disposable materials would be created.

A. Capturing Carbon Dioxide from Flue Gases of a Power Plant.

The utilization of coal in present technologies produces some undesirable emissions. These include oxides of nitrogen and sulfur, particulate emissions and greenhouse gases such as carbon dioxide. There are strong incentives to reduce these emissions and improve fuel efficiency of coal utilization technologies.

To address these challenges, new coal utilization technologies have been developed. One of the more promising of these is the Integrated Gasification Combined Cycle technology ("IGCC") used in power generation.

FIG. 1A shows a schematic flow diagram of a typical existing IGCC system. This system is typically used by coal-combustion power plants and its emission-scrubbing system for the purpose of cleaning and separating CO and $CO_2$ gases from the other flue gases produced by the power plant. Other processes such as sub-critical pulverized coal (SPC), ultra-supercritical pulverized coal (USCPC), and circulating fluidized bed (CFB), among others, can also be used, but the IGCC process is presented herein as one of the preferred systems.

IGCC is believed to be the type of system that will predominately be used in the future to add to the electrical power supply, and replace aging coal power plants and increasingly expensive natural gas power plants. The process offers options to eliminate greenhouse gases and produce useful hydrogen and/or liquid fuels.

The process used by IGCC plants can be broken down into two general technologies: The first technology is called coal gasification wherein coal is gasified to produce a synthetic gas (syngas). The second technology is called combined-cycle power generation which is one of the most efficient methods of commercially producing electricity available today. After pollutants are removed from the syngas, electricity is generated using the following process: 1) a gas turbine-generator is used to burn the syngas, 2) heat from the gasification and the exhaust heat from the gas turbine generator are used to create steam, and 3) steam is used to power a steam turbine-generator which helps generate electricity.

Coal gasification is a process that produces a clean coal gas (syngas) that can be used as the fuel for the gas combustion turbine. In this process, before the coal is combusted, coal is reacted with steam and air or oxygen under high temperatures and pressures to produce a gaseous fuel which mainly consists of hydrogen and carbon monoxide. The amount of air or oxygen ($O_2$) available inside the gasifier is preferably carefully controlled so that only a portion of the fuel burns completely. This "partial oxidation" process provides the heat necessary to chemically decompose the fuel and produce the synthesis gas (syngas), which is composed of hydrogen ($H_2$), carbon monoxide (CO), and minor amounts of other gaseous constituents.

The syngas is then processed in a water-gas-shift reactor, which preferably converts the CO to $CO_2$ and increases the $CO_2$ and $H_2$ molecular concentrations, such as to 40 percent and 55 percent, respectively, in the syngas stream. The carbon monoxide and high pressure water vapor in the presence of a catalyst then forms $CO_2$ and more $H_2$, which in practice, results in a fuel gas which can contain over 90% hydrogen. It also results in the carbon compounds being reacted to form carbon dioxide, which can then be easily removed, since the gas mixture is at a high pressure and the $CO_2$ is at a high concentration. Because $CO_2$ is present at much higher concentrations in syngas than in post-combustion flue gas, $CO_2$ capture is less expensive using pre-combustion techniques than post-combustion capture methods. Currently there are few gasification plants in full-scale operation, and the capital costs involved are higher than for conventional pulverized coal plants.

The syngas produced by the IGCC technology is preferably cleaned by a gas cleanup process—the $CO_2$ can be washed out of the hydrogen rich fuel gas using various solvents—and in one such application, the solvent used is MDEA. Instead of solvents, membranes can also be used for $CO_2$ separation and hydrogen purification using at least two approaches: 1) Water Gas Shift (WGS) membrane reactor, and 2) $CO_2$ removal followed by WGS reaction. In the first approach, the membrane removes $CO_2$, and the commercial $Cu/ZnO/Al_2O_3$ catalyst at 130 degrees C. to 160 degrees C. and shifts CO to $H_2$ so that it catalyzes the WGS reaction. By removing $CO_2$ simultaneously, the reversible WGS is shifted forward so that CO is converted to hydrogen and the CO concentration is then reduced significantly. A CO concentration of less than 10 ppm and a $H_2$ concentration of greater than 50% (on the dry basis) can be achieved at various feed gas flow rates. In the second approach, the process consists of a $CO_2$ selective membrane module followed by a conventional WGS reactor. The $CO_2$ selective membrane module removes more than 99% of the $CO_2$ in the syngas.

In the Combined Cycle Gas Turbine process ("CCGT"), the syngas is burned to produce electricity. As shown in FIG. 1A, the design of the CCGT power generator consists of a combustion turbine/generator, a heat recovery steam generator (H.R.S.G.), and a steam turbine/generator. The heat from the gasifier and exhaust heat from the combustion turbine are preferably recovered in the heat recovery steam generator to produce steam. This steam then passes through a steam turbine to power another generator which produces electricity. The CCGT is more efficient than conventional power generating systems because it re-uses the waste heat from the system to produce more electricity.

IGCC is a technology that comprises the following characteristics:

SOx, NOx and particulate emissions are much lower in IGCC plants than from a modern coal plant. Its volatile organic compounds (VOC) emissions and mercury emissions are comparable.

IGCC plants emit approximately 20% less $CO_2$ gas than a modern coal plant.

IGCC plants use 20-40% less water than a modern coal plant.

IGCC plants operate at higher efficiencies than conventional coal fired power plants thus requiring less fuel and producing less emissions. Current efficiency is 42% with efficiencies as high as 60% expected in the very near future using high efficiency turbines and some other process improvements.

Costs for electricity, without $CO_2$ capture, is about 20% higher than in a modern coal plant. Electricity costs are 40% lower than from a natural gas IGCC plant with natural gas at $6.50 per MMBTU.

$CO_2$ from an IGCC plant is captured much more easily than from a conventional coal combustion plant at an additional cost increase of 25-30% for capture and sequestration, without transportation charges.

IGCC captures the hydrogen that is part of the syngas stream in an economic manner.

The advantages of IGCC over current conventional coal-based power generation systems include:

1) Higher Efficiencies and Lower Emissions:

Improvements in efficiency dramatically reduce emissions from coal combustion. For example, increasing efficiency from 35% to 40% reduces carbon dioxide gas emissions by over 10%. With efficiencies currently approaching 50%, IGCC power plants use less coal and produce lower emissions of carbon dioxide than conventional power plants. With the development of new gas turbine concepts and increased process temperatures, efficiencies of more than 60% are being targeted.

2) Higher Output:

Using syngas in a gas turbine increases its output, especially when nitrogen from an oxygen blown unit is fed to the turbine. Thus a turbine rated at 170 MW when fired on natural gas can yield 190 MW or more on syngas. Furthermore, output is less dependent on ambient temperature than is the case with natural gas.

3) Product Flexibility—Including Carbon Capture and Hydrogen Production:

The gasification process in IGCC enables the production of not only electricity but a range of chemicals, by-products for industrial use, and transport fuels. Moreover, and most importantly, carbon dioxide can be captured from coal syngas (carbon monoxide and hydrogen) through a water/gas shift process. That is, $CO_2$ can be captured in a concentrated stream thereby making it easier to sequester. An added advantage is that there are low additional costs for carbon capture, particularly if the plant is oxygen driven.

Figure 1B:
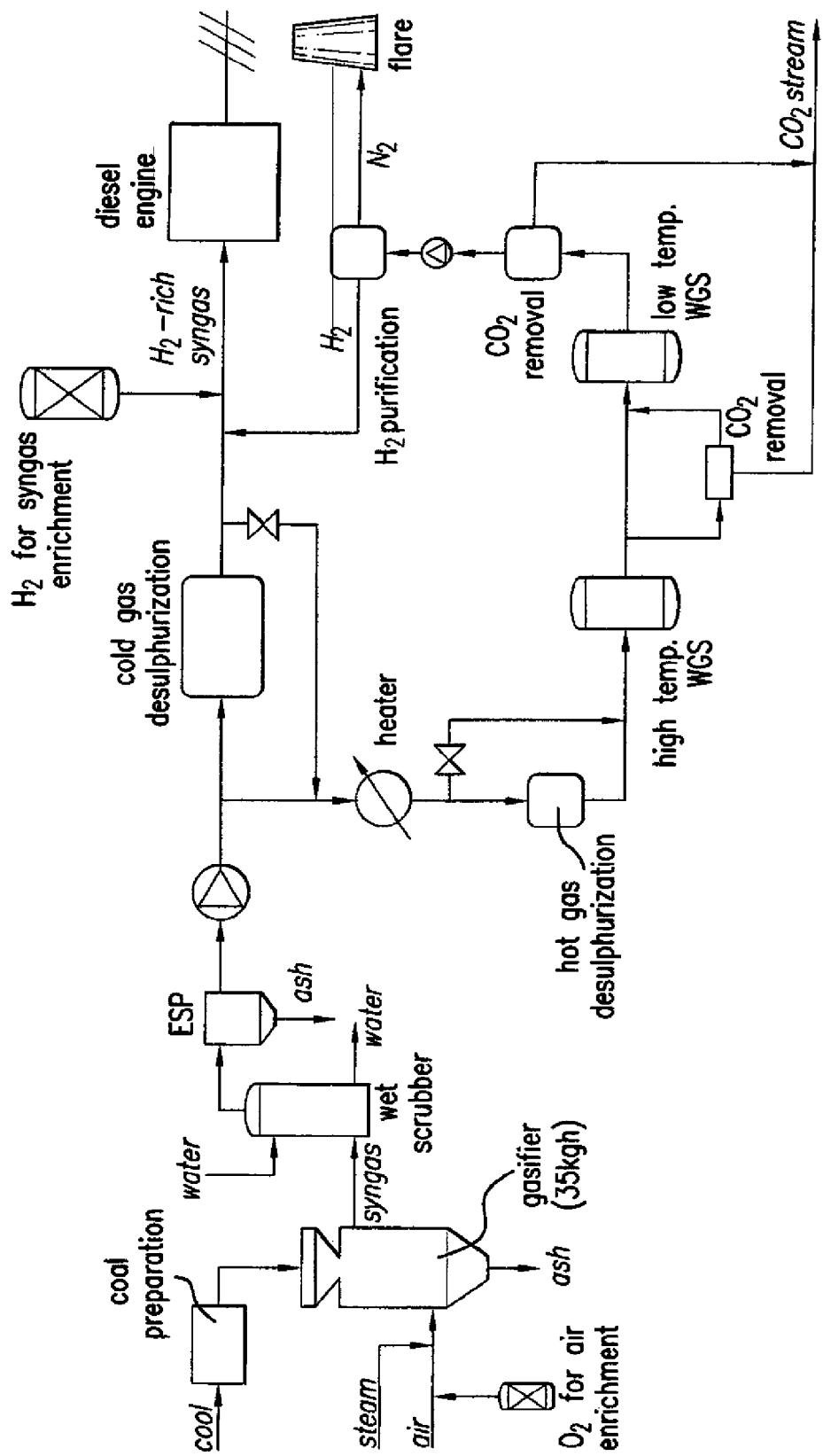
FIG. 1B is a schematic diagram showing an existing system for processing coal and removing the carbon dioxide therefrom (WGS reactor=Water Gas Shift reactor; ESP=Electrostatic Precipitator)

A related existing technology is shown in FIG. 1B, which shows the conceptual integrated lab scale power plant scheme, with the syngas coming out from the gasifier being subjected to a gas cleaning section consisting of a scrubber and an electrostatic precipitator (ESP). The sygnas is split in two streams: The first stream consists of 80% of the total gas flow which is sent to a power production line which is made up of: 1) a cold desulphurization system, and 2) an internal combustion engine for power production. The second stream consists of 20% of the total flow which is sent to a hydrogen production line which is made up of: 1) a hot desulphurization system, 2) two water gas shift sections (high and low temperatures), 3) two $CO_2$ separation stages to obtain an enriched hydrogen gas stream, and 4) a hydrogen purification system.

In this process, the CO in the flue gas is converted to $CO_2$ and $H_2$ by interaction with water. Thus the $CO_2$ in the flue gas is increased in concentration. This stream of $CO_2$ is then separated by the next process: Gas from the shift conversion undergoes further processing for the separation of carbon dioxide from hydrogen. Chemical processes, based on absorption with amines, are employed to remove carbon dioxide from the gas stream containing hydrogen using a reactor with hydrophilic and hydrophobic polymeric membranes. The process includes the following sections: 1) Syngas diffusion into the amine solution through hydrophilic membrane, 2) $CO_2$ absorption into the amine solution, and 3) Purified syngas separation through hydrophobic membrane.

Although the current IGCC power plant is the preferred approach that has been selected for use with the present invention, there are three key disadvantages found in existing IGCC plants: (1) excess power losses, (2) high cost of transporting $CO_2$, and (3) high cost of sequestering $CO_2$. Nevertheless, the intent of the present system is to reduce and in some configurations eliminate the power losses, as well as the need for transportation by expensive pipelines, and the need for sequestering.

The stream of carbon dioxide gas that is generated by the coal-combustion power plant and its emission-scrubbing operation was in the past disposed of by releasing it through smokestacks into the atmosphere, thus contributing significantly to the greenhouse gases in the atmosphere. Attempts have also been made to transport and sequester the $CO_2$ emissions using expensive pipelines and compression equipment, although none of these efforts have been very successful.

The present invention comprises a system that represents an improvement over past attempts to separate, transport and sequester the $CO_2$ gas emissions emanating from coal combustion power plants, and preferably uses super chilled air which can be mixed with $CO_2$ gas to form crystals that can agglomerate to form dry ice blocks or cylinders that can easily be transported and used to enhance oil recovery at abandoned oil wells. The solid carbon dioxide ice blocks and cylinders can be transferred from the coal combustion power plant and shipped offsite to be used elsewhere, and as a result, there are no remaining carbon dioxide footprints at the site.

B. Freezing Carbon Dioxide Gas to Form Solid Carbon Dioxide Crystals.

To freeze the $CO_2$ gases, the gases are preferably injected into an insulated mixing chamber, along with a predetermined amount of super chilled air, to flash freeze the carbon dioxide gas and form crystals that can be agglomerated together in a separate step, which will be discussed below. By mixing the super chilled air with the $CO_2$ gas in the chamber, frozen $CO_2$ gas crystals are formed in a dead zone area which causes them to float, agglomerate and fall to the bottom where they can be collected and agglomerated. This approach generally comprises the following steps:

1. Producing a volumetric flow of super chilled air at temperatures as low as minus 150 degrees F. to minus 180 degrees F., using a turbo compressor and turbo expander device.
2. Introducing the chilled air into an insulated mixing chamber.
3. Producing a volumetric flow of $CO_2$ gas, wherein the $CO_2$ gas is introduced into the chamber and mixed with the super chilled air to cause the temperature of the $CO_2$ gas to be reduced significantly. During the freezing process the $CO_2$ is preferably kept below 75.1 psia and colder than minus 69.5 degrees F. so that the gas is converted to a solid, although other pressures and temperatures can be used. The formation and use of solid $CO_2$ rather than liquid $CO_2$ avoids the issue of having to use a high pressure compressor and to build a thick-walled high-pressure containment vessel.
4. As the $CO_2$ gas mixes with the super chilled air, pure $CO_2$ crystals are formed which float downward and begin to agglomerate together at the bottom of the chamber, wherein the frozen $CO_2$ crystals will collect at the bottom.
5. A screw or other device can be provided at the bottom of the chamber to push the agglomerated $CO_2$ crystals down through a portal which allows the crystals to fall onto a conveyor belt with frames or molds with cartridges that can be used to form the ice blocks or cylinders. Alternatively, the pressure of the $CO_2$ feed can push the crystals laterally toward the distal end of the chamber, wherein cartridges in the desired shape can be provided to enable the appropriately shaped blocks and cylinders to be formed, as the crystals are pushed and agglomerated together at the far end.
6. A side duct is preferably provided in the chamber to allow the super chilled air to escape such that it can be separated from the $CO_2$ gas.
7. By using the $CO_2$ derived from coal combustion power plants, rather than fresh $CO_2$, the total consumption and release of $CO_2$ into the earth's atmosphere can be reduced.

The present invention preferably involves producing the super chilled air with a turbo compressor and turbo expander device, wherein the device can draw ambient air and compress it, and then release it, to cause the compressed air to become super chilled. At least two different compression methods are contemplated as follows: (1) a turbo compressor and turbo expander device having the capacity to generate super chilled air without storing the compressed air first, and (2) a compressed air energy storage system having a high pressure storage tank wherein a turbo compressor compresses the air into the tank and a turbo expander is used to release and expand the compressed air out of the tank to produce super chilled air. In either case, the super chilled air is preferably injected into the mixing chamber to flash freeze the $CO_2$ gas inside the chamber.

The present invention preferably comprises a system that can be used to introduce the $CO_2$ gas and super chilled air in the appropriate amounts and at the appropriate rates to ensure that the final temperature of the $CO_2$ gas crystals that form in the chamber will remain at or below minus 109.3 degrees F. The $CO_2$ gas and super chilled air are preferably introduced into the chamber under sufficient pressure to cause them to mix properly, such that the cold temperature is transferred to the $CO_2$ gas, and $CO_2$ gas crystals can form and agglomerate. The rate and flow of each is preferably predetermined and controlled, as well as the overall size and configuration of the chamber, so that the resultant mixture quickly reaches the optimum temperature and appropriately sized crystals and properties are achieved.

Figure 2:
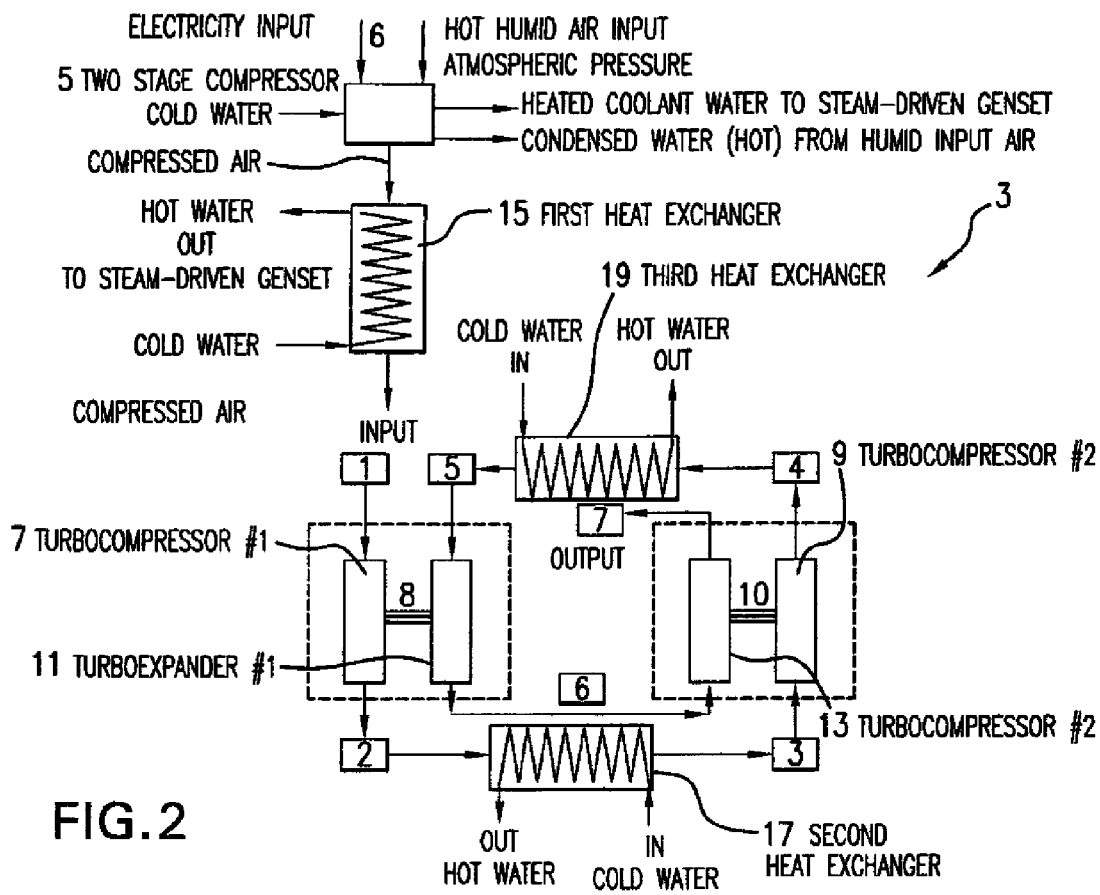
FIG. 2 is a schematic drawing showing an embodiment of the CTT device used to generate super chilled air that utilizes a two stage turbo compressor and two stage turbo expander set with a two stage compressor, wherein the turbo compressor and turbo expander sets are located on a common shaft, and multiple heat exchangers for removing heat from the compressors are provided.
Figure 3:
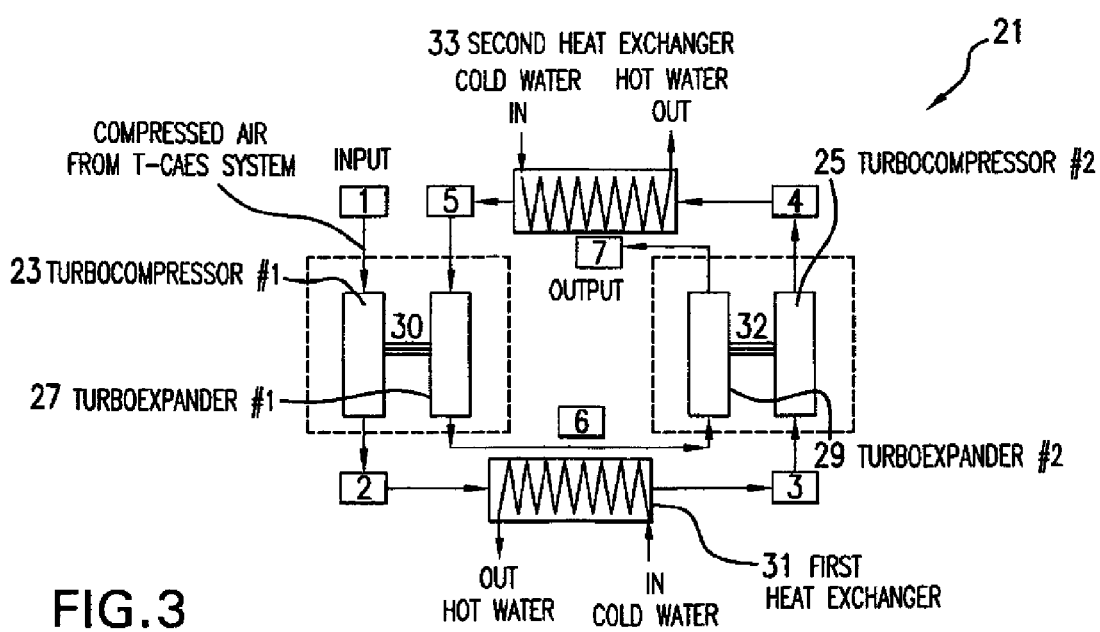
FIG. 3 is a schematic drawing showing an embodiment of the TCAES system used to generate super chilled air that incorporates a storage tank, and utilizes a two stage turbo compressor and two stage turbo expander set, wherein the turbo compressor and turbo expander sets are located on a common shaft, and multiple heat exchangers for removing heat from the compressors are provided.

Although the above cooling and freezing steps can readily be accomplished by any conventional cooling and/or refrigeration system, the present invention preferably uses a turbo compressor and turbo expander device with a free spooling arrangement, such as those shown in FIGS. 2 and 3, which permit higher mass flow rates of air with higher compression of air whereby final expansion to atmospheric pressure can produce super chilled air. Furthermore, the footprint and volume of the hardware are preferably small compared to conventional refrigeration machinery. Turbo machinery, in particular, can be essential to the success of any cryogenic process. An example of the type that can be used is produced by CryoMachinery (Air Products) which is a radial inflow turbo expander that provides refrigeration for some of the most efficient air separation and liquefaction facilities in the world today. High-pressure turbo expanders are typically used to provide refrigeration for the production of cryogenic liquids; the expander extracts work from a high-pressure gas stream providing refrigeration to the process. The work removed from the gas stream by the expander is used to provide power to the compression cycle.

FIG. 2 shows a two stage turbo expander CTT device 3 that has a two stage compressor 5, a two stage turbo compressor 7, 9, and a two stage turbo expander 11, 13, along with first, second and third heat exchangers, 15, 17 and 19. The operation of CTT device 3 preferably begins with two stage compressor 5 initially pressurizing the ambient air using a small amount of energy from the coal combustion power plant, i.e., a minimal amount of power 6 is tapped from the coal-combustion power plant to drive compressor 5. Nevertheless, as will be discussed, this energy can be reduced if the waste heat from the system is recovered and used in a co-located steam-fired generator set or co-located chiller. A separate power source can also be employed.

Compressor 5 preferably comprises a coolant system of its own that helps to reduce the temperature of the compressed air as it is being pressurized, wherein cold water (such as at 60 degree F.) can be distributed through the compressor and used as the coolant, wherein the heated water can then be distributed to an associated steam driven generator set 89, such as shown in FIG. 5, to produce additional electricity or can be fed to a chiller.

First heat exchanger 15 can be provided downstream from compressor 5 as shown in FIG. 2. Additional cold water (such as at 60 degrees F.) can be distributed through first heat exchanger 15 to reduce the temperature of the compressed air, such as down to room temperature, which helps to ensure that the eventual chilled air used by the system is substantially cooled. The heated coolant water can then be distributed to associated steam driven generator set 89, and used to produce additional electricity, again, as shown in FIG. 5, if desired.

The compressed air from compressor 5 that passes through first heat exchanger 15 is then preferably introduced into first stage turbo compressor 7, where the compressed air is compressed and heated again. First turbo compressor 7 preferably takes the compressed air from compressor 5 and compresses it further to increase the pressure, but thereafter, because additional heat will also be generated, the heated and compressed air is passed through second heat exchanger 17 which reduces the temperature of the compressed air again, using substantially the same coolant system described above in connection with first heat exchanger 15, wherein cold water can be used as the coolant and the heated water can then be used in an associated steam generator set 89, to produce more energy as shown in FIG. 5.

The compressed air that has been cooled is then passed into second turbo compressor 9 wherein the compressed air is compressed and heated again. The heated and compressed air is then passed through third heat exchanger 19 which reduces the temperature of the air again, using substantially the same coolant system described above in connection with first and second heat exchangers 15 and 17, wherein the heated water can then be used in an associated steam generator set 89, to produce more energy, as shown in FIG. 5.

Once the compressed air is fully pressurized, such as up to 215 psia, and cooled, such as down to about room temperature, the compressed air is then released and expanded by first and second turbo expanders 11, 13 (see FIG. 2), which release the compressed air to produce super chilled air. In this respect, it should be noted that as compressor 5 is fired up and works to compress the ambient air, and air is passed through the system, because first turbo compressor 7 and first turbo expander 11 are located on a common shaft 8, and because second turbo compressor 9 and second turbo expander 13 are located on a common shaft 10, the rotation of the two turbo expanders will cause the two turbo compressors to rotate as well, until a steady state (spooling) condition of operation is achieved. Each set of spooling impellers are independently situated and therefore can have their own rotational speeds.

The basic operation of device 3 therefore starts with compressed air being generated by compressor 5 and then being introduced into first stage turbo compressor 7, and then into second stage turbo compressor 9, and by the time the compressed air is released and expanded by turbo expanders 11, 13, because first turbo expander 11 is located on the same shaft as first turbo compressor 7, and second turbo expander 13 is located on the same shaft as second turbo compressor 9, when first and second turbo expanders 11, 13 begin to rotate, first and second turbo compressors 7, 9 will also begin to rotate. All four components—first and second turbo compressors 7, 9, and first and second turbo expanders 11, 13—will begin rotating as a result of the torque (mechanical work) generated by first and second turbo expanders 11, 13, to drive first and second turbo compressors 7, 9, respectively. In this respect, the rotational speed of shafts 8 and 10 produced by first and second turbo expanders 11, 13, respectively, preferably provides sufficient power to drive first and second turbo compressors 7, 9, respectively, until they reach an equilibrium input pressure.

When the steady state condition of operation is achieved—which can occur within a few seconds—turbo compressors 7, 9 continue to compress the air, and thereafter, the compressed air continues to be released and expanded by turbo expanders 11, 13, which produces super chilled air. Each set of turbo compressor and turbo expander devices has its own rotational speed and power rating.

Preferably, heat exchangers 15, 17 and 19 help to reduce the temperature of the compressed air as the compressed air is being pressurized by compressor 5 and turbo compressors 7, 9, respectively. This way, the heat generated by the compressors can be expelled so that the heat does not affect or offset the temperature of the chilled air being generated. In this respect, heat exchangers 15, 17 and 19 are preferably any conventional type such as a counter flow system that uses a coolant, such as cold water, to draw heat away from the compressors (and the compressed air that they produce), wherein once heat is exchanged, the coolant can be transferred to an associated generator such as a steam turbine generator and/or absorption chiller. The heat exchangers preferably force the high temperature compressed air produced by the compressors to surrender the heat contained therein to the coolant, wherein as the coolant is heated, the temperature of the compressed air produced by the compressors can be substantially reduced.

In a counter flow heat exchanger, the cold coolant water is preferably introduced into the heat exchanger on the same end as the cooled air exits, while at the same time, the heated air is introduced into the heat exchanger on the same end as the heated water exits. That is, coolant water is introduced into one end, and heated air is introduced into the opposite end, and the coolant water and heated air are allowed to pass through the heat exchanger in opposite directions. This way, the heated air can be introduced into the same end where the heated water exits, and the cold water can be introduced into the same end where the cool air exits, thereby helping the heat exchangers to operate more efficiently.

The CTT device 3 generally comprises the following: 1) The expansion process in the downstream turbo expander produces "work" that is transmitted through the shaft attached to the upstream turbo compressor so that they both have the same rotational speed during acceleration and when the final equilibrium rotational speed is achieved. When steady state equilibrium is reached, the turbo expander and turbo compressor, on the same shaft, achieve the same rotational speed, wherein this equilibrium state is called the "free spooling" mode. The turbo compressor in such case allows higher pressures to be achieved so that the overall expansion to atmospheric pressure can be increased. 2) The hot air generated by the compression of the turbo compressor is cooled by coolant water so that the intake to the turbo expander can be reduced such as to about room temperature. Thus, when the expansion occurs from the steep pressure drop, air temperatures in the range of minus 150 degrees F. to minus 180 degrees F. can be achieved. 3) The turbo compressor and turbo expander rotate at very high rotational speeds, on the order of 30,000 to 70,000 RPM, so that huge air mass flows are processed when huge temperature drops occur. 4) The high rotational speeds require that the impeller wheels are measured to avoid supersonic tip speeds at the circumference of the impeller. Thus these devices are preferably small, especially when compared to the mammoth conventional refrigeration and conventional chiller systems.

Figure 6:
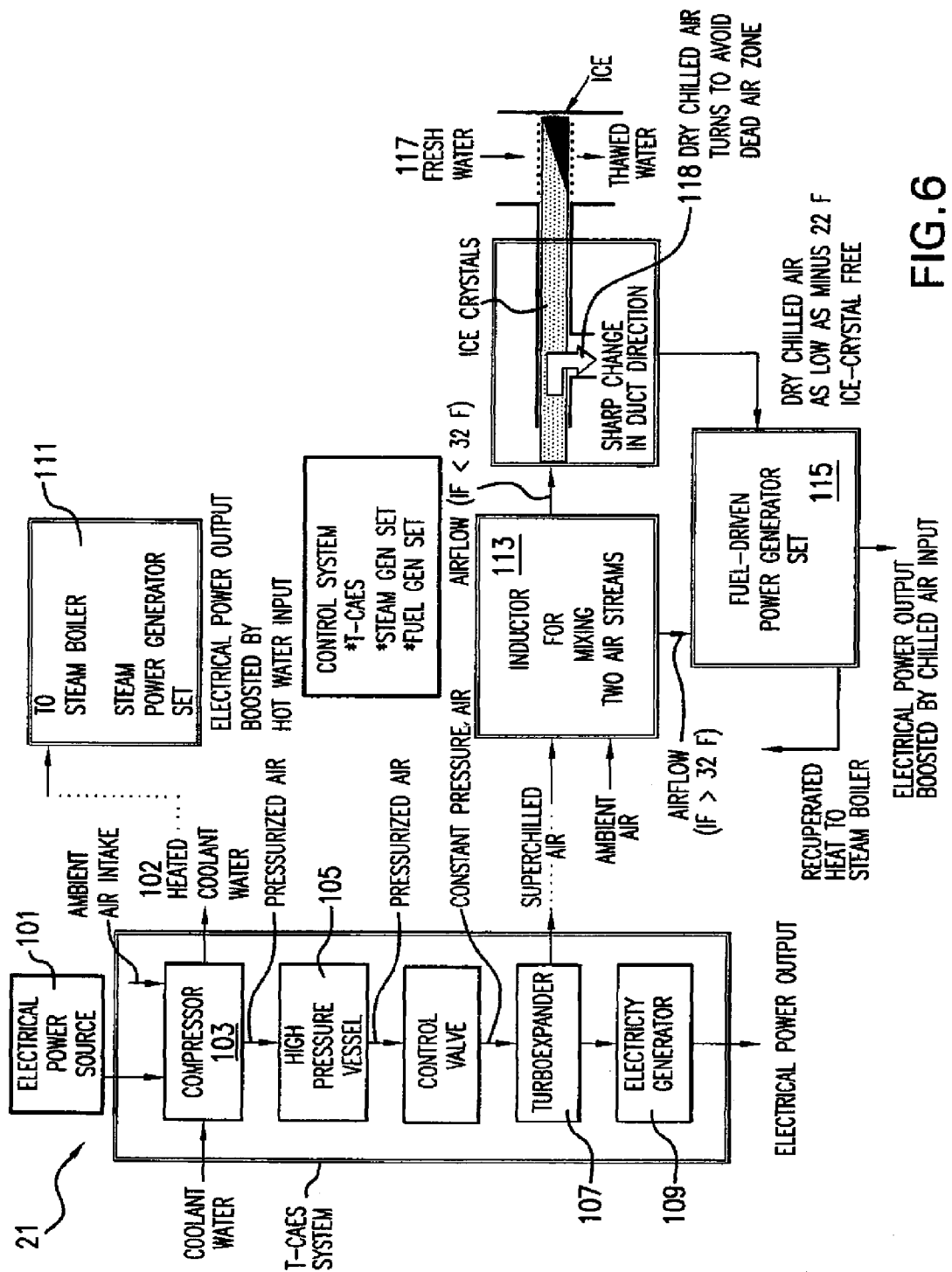
FIG. 6 is a schematic drawing of the TCAES device showing the various components and method steps for increasing the efficiency of a fuel driven turbine generator, including the steam turbine generator.

FIG. 3 shows a two stage turbo expander TCAES device 21 that has a two stage turbo compressor 23, 25, and a two stage turbo expander 27, 29, along with first and second heat exchangers, 31 and 33. The operation of TCAES device 21 is similar to CTT device 3, except that the compressed air is stored in a high pressure tank 105, as shown in FIG. 6, and can be released at any time, which provides the added benefit of acting as a time-shifting means, i.e., when the energy is produced can be different from when it is used. The compressed air from tank 105 is preferably introduced into first stage turbo compressor 23, where the compressed air is compressed and heated again. First turbo compressor 23 preferably takes the compressed air from tank 105 and compresses it further to increase the pressure further. Thereafter, because additional heat will also be generated, the heated and compressed air is preferably passed through first heat exchanger 31 which reduces the temperature of the compressed air, using substantially the same coolant system described above in connection with CTT device 3, wherein cold water can be used as the coolant, and wherein the heated water can be used in an associated steam generator set 111 to produce more energy.

The compressed air that has been cooled is then passed into second turbo compressor 25 wherein the compressed air is compressed and heated again. The heated and compressed air is then passed through second heat exchanger 33 which reduces the temperature of the air again, using substantially the same coolant system described above in connection with first heat exchanger 31, wherein the heated water can then be used in an associated steam generator set 111, as shown in FIG. 6, to produce more energy.

Once the compressed air is fully pressurized, such as up to 215 psia, and cooled, such as down to about room temperature, the compressed air is preferably released and expanded by first and second turbo expanders 27 and 29, which release and expand the compressed air to produce super chilled air. In this respect, it should be noted that as compressed air is fed into first turbo compressor 23, because first turbo compressor 23 and first turbo expander 27 are located on a common shaft 30, and because second turbo compressor 25 and second turbo expander 29 are located on a common shaft 32, the rotation of the two turbo expanders will cause the two turbo compressors to rotate as well, until a steady state condition of operation is achieved.

The basic operation of device 21 starts with compressed air being introduced into first stage turbo compressor 23, and then into second stage turbo compressor 25, and by the time the compressed air is released and expanded by turbo expanders 27, 29, because first turbo expander 27 is located on the same shaft as first turbo compressor 23, and second turbo expander 29 is located on the same shaft as second turbo compressor 25, when first and second turbo expanders 27, 29 begin to rotate, first and second turbo compressors 23, 25 will also begin to rotate. All four components—first and second turbo compressors 23, 25, and first and second turbo expanders 27, 29—will begin rotating as a result of the torque (mechanical work) generated by first and second turbo expanders 27, 29, which help to drive first and second turbo compressors 23, 25, respectively. The rotational speed of shafts 30, 32 preferably provides sufficient power to drive first and second turbo compressors 23, 25, respectively, until they reach an equilibrium input pressure. When the steady state condition of operation is achieved—which can occur within a few seconds—turbo compressors 23, 25 continue to compress the air, and thereafter, the compressed air continues to be released by turbo expanders 27, 29, which produces super chilled air.

Preferably, heat exchangers 31, 33 help to reduce the temperature of the compressed air as the compressed air is being pressurized by turbo compressors 23, 25, respectively. This way, the heat generated by the compressors can be expelled so that the heat does not affect or offset the temperature of the chilled air being generated thereby. In this respect, heat exchangers 31, 33 are preferably any conventional type such as a counter flow or co-flow type, as discussed above.

Figure 4:
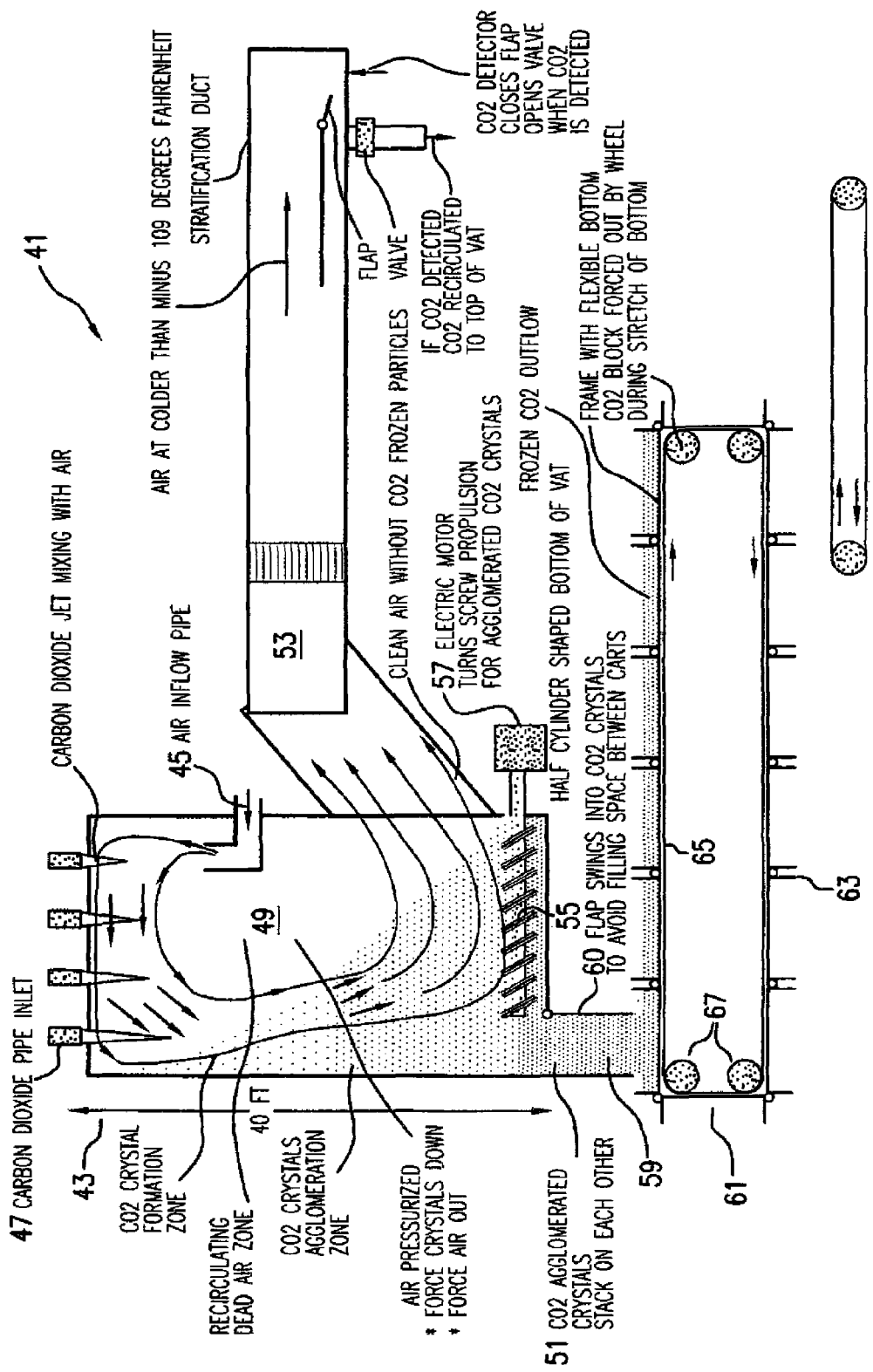
FIG. 4 is a schematic drawing showing an embodiment of the present system having a mixing chamber for mixing the $CO_2$ gas emissions with super chilled air, wherein the chamber has a side air duct for separating the chilled air from the frozen $CO_2$ crystals, and wherein the frozen $CO_2$ crystals are allowed to collect at the bottom of the chamber where they can form dry ice blocks for easy transport and use.

FIG. 4 shows a proposed solution 41 that takes the $CO_2$ gases that are separated from the coal or remaining gases emitted from a coal combustion power plant and freezes it, and stores it. That is, in the proposed solution, the $CO_2$ gas derived from coal using an IGCC system is preferably introduced into a chamber 43 and then chilled and desublimated by interaction with super-chilled air (derived from CTT device 3 or TCAES device 21) to produce frozen carbon dioxide crystals which can be agglomerated to form ice blocks or cylinders which can then be easily transported and used. This process eliminates the need to dig mines, use existing caverns, or to find algae deposits, or lime quarries, or build pipelines. Instead, the $CO_2$ gas is frozen into solid blocks or cylinders of dry ice which can then be delivered to virtually any site—which can offset the high costs associated with separating the $CO_2$ using IGCC.

Generally speaking, the present system incorporates a system for injecting the $CO_2$ gases into chamber 43, along with a predetermined amount of super chilled air, which helps to flash freeze the $CO_2$ gas to form crystals that can then be agglomerated together to form the frozen blocks or cylinders. In one application, the super chilled air is injected upward into chamber 43 through multiple inlets 45 spaced around the perimeter thereof, while the $CO_2$ gas is introduced downward through multiple inlets 47. This way, as the two mix, frozen $CO_2$ crystals can form within dead zone area 49 and be circulated, causing them to agglomerate together. By introducing a volumetric flow of super chilled air at minus 150 degrees F. to minus 180 degrees F., into an insulated mixing chamber 43, and then introducing a volumetric flow of $CO_2$ gas, the temperature of the $CO_2$ gas can be reduced significantly, such as down to minus 109.3 degrees F. or lower. Then, as the $CO_2$ gas mixes with the super chilled air, and freezes due to heat exchange, pure $CO_2$ crystals are formed. Over time, i.e., less than a few seconds, the frozen $CO_2$ crystals agglomerate and fall to the bottom of chamber 43, wherein they collect and can be used to form dry ice blocks or cylinders, as will be discussed.

One of the keys is mixing an appropriate percentage of $CO_2$ gas (at room temperature) with an appropriate amount of super chilled air (at minus 150 degrees F. to minus 180 degrees F.) to cause the mixture to reach the appropriate temperature that would result in the formation of frozen $CO_2$ crystals. In this respect, a side duct 53 is preferably provided on the side of chamber 43 which enables the chilled air to pass through chamber 43 and be circulated out, such that the chilled air can cause the $CO_2$ crystals to be pressurized downward (by gravity and inertia), thereby helping to force the frozen $CO_2$ crystals toward the bottom of chamber 43. For this to occur, it is desirable that inlets 47 be located above the outlet (which is side duct 53), such that the air within chamber 43 effectively circulates downward through chamber 43.

The present invention preferably comprises a system that can be used to introduce the $CO_2$ gas and super chilled air in the appropriate amounts and at the appropriate rates to ensure that the final temperature of the $CO_2$ gas crystals that form in chamber 43 will remain at or below minus 109.3 degrees F. In this respect, the $CO_2$ gas and super chilled air are preferably introduced under sufficient pressure to cause them to mix properly, and to transfer the cold temperature of the air to the $CO_2$ gas. The rate and flow of each is preferably predetermined and controlled, as well as the overall size and configuration of chamber 43, and inlet openings 45, 47, so that the resultant mixture reaches the optimum temperature and appropriately sized crystals and properties can be achieved.

The direction that the $CO_2$ gas and super chilled air are introduced into the chamber can contribute to the proper formation of the $CO_2$ crystals and therefore the agglomeration of the ice mass. In this respect, the present invention contemplates both 1) counter-flow and 2) co-flow arrangements. The factors that determine which to use depend on how quickly the $CO_2$ needs to be frozen, which is dependent on the temperature of the $CO_2$ gas and how cold the super chilled air is before they enter into chamber 43, as well as the size of the chamber, how much of each is introduced into chamber 43, and at what rate, etc.

In the counter flow embodiment, as discussed above, the system preferably has a chamber that injects the $CO_2$ gas downward into the chamber, wherein the super chilled air is introduced upward from multiple inlets spaced around the perimeter of the chamber. This is referred to as counter flow because the $CO_2$ gas and super chilled air are injected in opposite directions to increase the mixing capability as well as reduce the residence time of the crystals in the chamber. This also reduces the capital investment required for the system by reducing the height of the mixing chamber.

In the co-flow embodiment, on the other hand, both the $CO_2$ gas and super chilled air are introduced in the same direction which allows for a speedier drop of crystals to the bottom as well as a cyclonic separation of the crystals from the air.

In either case, during the downward flight of the $CO_2$ crystals through the chilled air, the crystals will get colder and agglomerate together as they fall, wherein by the time they reach the bottom, preferably, they will be at the appropriate temperature. Side duct 53 is preferably provided on the side of chamber 43 to allow the chilled air to escape while permitting the $CO_2$ crystals to fall or be projected down to the bottom. This helps to ensure that the crystals are separated from the chilled air, wherein the chilled air can then be directed out of chamber 43 and used for cooling purposes, such as to provide additional cooling for HVAC, refrigeration, air intake to a fuel-driven generator set and/or desalination, which further increases the efficiency of the overall system.

Figure 16:
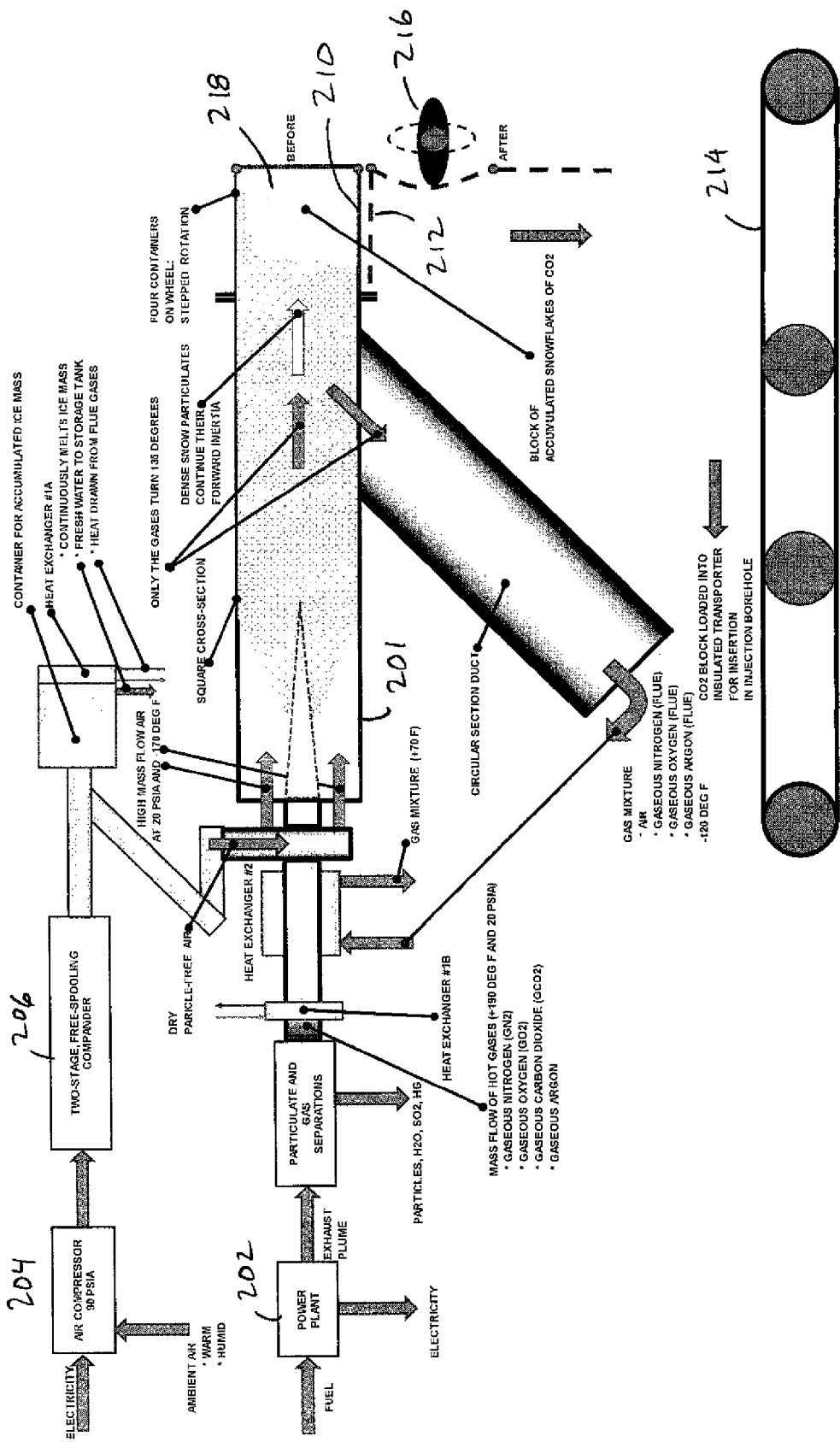
FIG. 16 is a schematic drawing showing a process for creating super chilled air using a compressor and compander device, and a chamber into which carbon dioxide gas and super chilled air are injected into and mixed, to produce frozen carbon dioxide crystals, wherein the chamber is extended substantially horizontally such that the crystals can be agglomerated and formed into various configurations, including blocks or cylinders, at the far end, using molds or cartridges having the desired shape.
Figure 17:
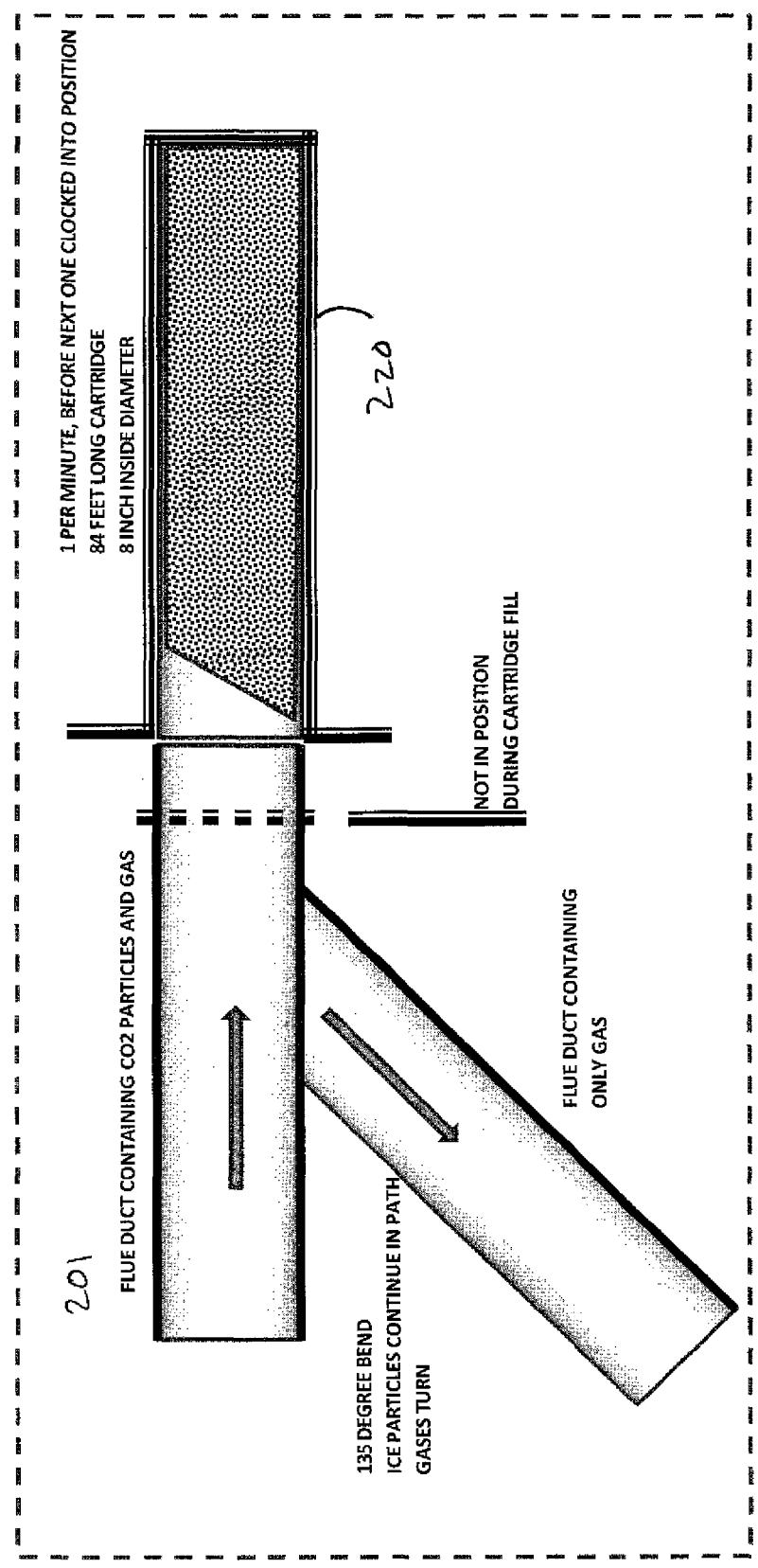
FIG. 17 is a schematic drawing showing an apparatus for creating cylinders of frozen agglomerated carbon dioxide crystals using an elongated cartridge.

As shown in FIG. 4, a screw 55 with a motor 57 or other device can be provided at the bottom of chamber 43 to help push the agglomerated $CO_2$ crystals that accumulate at the bottom of chamber 43 through a portal 59 which allows the crystals to fall onto a conveyor system 61 with frames 63 that can be used to form ice blocks. Alternatively, as shown in FIGS. 16 to 17, the crystals can be forced laterally across the chamber by virtue of the $CO_2$ feed, and pushed into molds or cartridges, to form elongated cylinders of frozen carbon dioxide gas, as will be discussed.

In the embodiment shown in FIG. 4, bottom 65 of chamber 43 is preferably configured with a half cylinder shape that matches the exterior shape of screw 55, such that essentially all of the crystals accumulated at bottom 65 can be pushed through portal 59. Portal 59 can have a door 60 that swings open to allow the agglomerated crystals to fall at the appropriate time. Preferably, door 60 can be made to operate so that batches of crystals can fall onto conveyor system 61, such as with intermittent gaps, which can help to promote forming distinct ice blocks. Door 60 or edge of portal 59 can be provided at a predetermined height so that as the ice blocks are moved along conveyor system 61, they form slabs having a predetermined thickness.

In this respect, it has been found that it is desirable for the crystal mass at the bottom of the chamber to remain at slightly lower than the freezing temperature of $CO_2$, such that the dry ice crystals will remain frozen while the blocks are being created. For these reasons, it is important that the temperature of the chilled air inside the chamber, and the temperature of the $CO_2$ gas, and the rate of introduction of each, are all controlled to obtain the optimum results.

In this embodiment, frames 63 are preferably provided on flexible conveyor belt 65 with rollers 67, so that as the crystals fall, they are separated by the frames and begin forming distinct ice blocks. The flexibility of belt 65 preferably enables the ice blocks that are formed to be easily released as the conveyor rotates and turns downward, as shown in FIG. 4—at the bottom right corner. It also enables conveyor system 61 to rotate in a circular fashion, i.e., in an endless loop. Thereafter, the ice blocks can readily be transported and used.

FIGS. 5 and 6 show how various components can be added to the CTT device 3 and/or TCAES device 21 to increase the efficiency thereof. In this respect, FIG. 5 shows CTT device 3, wherein the waste heat from the compressor 75 and turbo compressor 79 can be used to provide heated water to a steam driven turbine generator 89 to increase the efficiency thereof. The energy produced thereby can also be used to power the IGCC system. Also, the chilled air produced by the CTT device can, in addition to being used to freeze $CO_2$ gas as discussed above, be used to provide cool inlet air into an associated fuel driven turbine generator 91. In this respect, it can be seen that increased efficiency is achieved by recycling the heat and energy produced by the CTT device and producing additional energy in the form of electricity which can then be used to power the IGCC system and/or in the form of chilled air to provide additional cooling for HVAC, refrigeration and/or desalination. This allows for more cost savings to be achieved which can further offset the cost of separating the $CO_2$ gas from the coal.

In this respect, the present invention preferably incorporates by reference the method and system described in Applicants' related U.S. Pat. No. 8,833,083, which issued on Sep. 16, 2014, entitled "Method and Apparatus for Using Compressed Air to Increase the Efficiency of a Fuel Driven Turbine Generator." That system relates to an improved method and system for increasing the efficiency of a fuel driven turbine generator wherein the system preferably uses super chilled air from a CTT device to inject cool air into the compressor turbine of a fuel driven turbine generator, for more efficient operation thereof. Unlike previous devices for cooling the inlet air, that system utilizes compressed air expanded by a turbo compressor and turbo expander device to generate super chilled air, wherein the system produces cool dry inlet air that can be drawn into the fuel driven generator 91. By removing the moisture from the inlet air using a centrifuge, when the inlet air is accelerated through the nacelle and into the compressor turbine, no ice particles are formed that could damage the turbine blades.

The chilled air produced by CTT device 21 that exits chamber 43 is preferably mixed in an eductor 85 with ambient air to produce a relatively cool inlet air for introduction into the compressor turbine 92 of the fuel driven turbine generator 91. In such case, the chilled air can be introduced into eductor 85 through one or more openings, wherein the velocity of the super chilled air helps to draw ambient air through the openings and into eductor 85. Then, as the two air masses are mixed together, what emerges is a relatively cool mass flow of air that can be used as the inlet air to increase the efficiency of fuel driven turbine generator 91.

An advantage of producing cool air and using it as the inlet air in the compressor turbine 92 is that the air becomes denser, and has greater mass flow, and therefore, the compressor turbine 92 doesn't have to work as hard to compress an equivalent volume of inlet air into combustion chamber 94. Accordingly, compressor turbine 92 can consume less energy, wherein more energy can become available to drive the electric generator 96, i.e., a greater portion of the energy produced by the system can be used to drive electric generator 96 and produce electricity. What results is that less energy is used to operate compressor turbine 92, which advantageously means that more energy is available to drive electric generator 96, which helps to increase the ability of the system to produce more energy per unit volume of fuel consumed.

Another advantage is that the chilled air can be used to remove the moisture from the inlet air and avoid the creation of ice particles that can damage the turbine blades. This is accomplished by using the chilled air as a means of flash freezing the water vapor within the ambient air and then separating the ice particles (including the solid particulates trapped within the ice particles) from the chilled air. That is, as the warm ambient air is mixed with the chilled air, most of the water vapor that exists within the ambient air can be flash frozen to form tiny ice particles. Then, as the ice particles fall to the bottom of a separation compartment (or centrifuge 87), the cool dry air can be directed into a side duct that extends at about ninety degrees relative to the axis of the centrifuge 87, wherein as the high speed ice particles continue on their straight inertial trajectory, the cool dry air can then turn the corner and pass through the passageway and leave the ice particles behind, thereby producing cool "dry" air.

As discussed, the elimination of ice particles from the cool inlet air not only increases the efficiency of the system but also avoids pitting and causing damage to the turbine blades. The entrance into compressor turbine 92 of fuel driven turbine generator 91 is typically in the shape of a nozzle or nacelle, with a relatively wide opening followed by a relatively narrow nacelle, where the compressor turbine blades are located. Accordingly, as the inlet air is accelerated through the nacelle, an approximately adiabatic acceleration of the drawn-in air results from a constriction of the flow path, wherein this condition is associated with an enthalpy reduction, which in turn, produces a significant temperature drop. Although lower inlet air temperatures results in greater system efficiencies, the downside is that if the temperature of the inlet air was reduced to below freezing, ice particles can form that could otherwise strike the turbine blades and cause damage thereto.

Heat exchangers, such as 77, 81 can be used to draw heat produced by air compression away and transfer it to steam turbine generator system 89 and/or chiller system associated therewith to enhance the performance thereof. The heat exchangers preferably comprise a coolant, such as water, that can be channeled through the compressor units to transfer heat from the device to associated steam turbine generator device 89 and/or chiller system. For the steam generator, pre-heated water can be made available for the associated boiler 90 so that the water in the boiler can be brought to boiling using less energy. By withdrawing the heat from the device, and preheating the coolant water, and introducing the coolant water into boiler 90, not only is the steam turbine generator 89 made more efficient, but the entire system can be made more efficient in producing electricity. The steam driven turbine generator 89 can be any conventional type that uses a boiler 90 to create steam, which in turn, drives a steam turbine 86 wherein an electrical generator 88 can be driven to produce electricity.

In another embodiment, the chilled water produced as the ice particles melt in the centrifuge 87 is used to provide cooling for ancillary devices. That is, as the ice particles are collected at the bottom of the centrifuge, they can be thawed to produce chilled water that can be transferred to an associated device such as a thermal energy storage system 84 wherein the chilled water can be stored for later use. Thermal energy storage system 84 preferably comprises a stratification tank in which the chilled water can be stored, and from which the chilled water can be removed to provide cooling for ancillary devices, such as HVAC, refrigeration, air intake to a fuel-driven generator set and/or desalination or the like, etc. After the chilled water is used to provide the necessary cooling for these devices, the water is then recycled back into the stratification tank, wherein by storing the chilled water in this fashion, water can be made available when it is needed—on demand. In an alternate embodiment, the chilled water can be used directly to provide cooling for HVAC, refrigeration, air intake to a fuel-driven generator set and/or desalination or the like, etc., without storing it first.

FIG. 6 shows TCAES device 21, wherein the waste heat from the compressor 103 can be used to provide heated water to a steam driven turbine generator 111 to increase the efficiency thereof. In this embodiment, air is preferably compressed by compressor 103 and compressed air is preferably stored in vessel 105, wherein a control valve 104 controls the passage of the air out of vessel 105, and allows the compressed air to be released by turbo expander 107. The chilled air produced by turbo expander 107 can, in addition to being used to freeze $CO_2$ gas as discussed above, be used to provide cool inlet air into an associated fuel driven turbine generator 115, to increase the efficiency thereof.

In this respect, it can be seen that increased efficiency is achieved by recycling the heat produced by compressor 103 and using it in steam power generator 111, which can generate electricity that can be used to power the IGCC system. The chilled air produced by turbo expander 107 can also be used to provide additional cooling for HVAC, refrigeration, air intake to a fuel-driven generator set and/or desalination, wherein additional electricity can also be generated by generator 109 as turbo expander 107 rotates. This allows for more cost savings to be achieved which can further offset the high cost of separating the $CO_2$ gas from the coal.

In the TCAES device shown in FIG. 6, the chilled air produced by the device and that exits from chamber 43 is preferably mixed with ambient air to produce a relatively cool inlet air for introduction into the compressor turbine of the fuel driven turbine generator 115. In such case, a mixing compartment or inductor 113 is preferably provided, wherein the chilled air can be introduced through one or more openings, and the velocity of the super chilled air can help to draw ambient air through the openings and into inductor 113. Then, as the two air masses are mixed together, what emerges is a relatively cool mass flow of air that can be used as the inlet air to increase the efficiency of the fuel driven turbine generator 115.

Another advantage of this device is that the chilled air can be used to remove the moisture from the inlet air and avoid the creation of ice particles that can damage the turbine blades. This is accomplished by using the chilled air as a means of flash freezing the water vapor within the ambient air and then separating the ice particles (including the solid particulates trapped within the ice particles) from the chilled air. That is, as the warm ambient air is mixed with the chilled air, most of the water vapor that exists within the ambient air can be flash frozen to form tiny ice particles. Then, as the ice particles fall in a separation compartment (or centrifuge 117), the cool dry air can be directed into a side duct or passageway 118 that extends at about ninety degrees relative to the axis of the centrifuge, wherein as the high speed ice particles continue on their straight inertial trajectory, the cool dry air can then turn the corner and pass through the passageway and leave the ice particles behind, thereby producing cool "dry" air.

As discussed, the elimination of ice particles from the cool inlet air not only increases the efficiency of the system but also avoids pitting and causing damage to the turbine blades. The entrance into the fuel driven turbine generator 115 is typically in the shape of a nozzle or nacelle, with a relatively wide opening followed by a relatively narrow nacelle, where the compressor turbine blades are located. Although lower inlet air temperatures resulted in greater system efficiencies, the downside was that if the temperature of the inlet air was reduced to below freezing, ice particles can form that could otherwise strike the turbine blades and cause damage thereto.

As shown in FIG. 6, device 21 preferably begins with compressor 103 that initially pressurizes the air within pressure tank or vessel 105, such as to a pressure of 90 psia, wherein compressor 103 and tank 105 can be provided with a heat exchanger 102 that distributes the heated coolant water to an associated steam turbine generator 111. The heat exchanger preferably comprises a coolant that helps to reduce the temperature of the compressed air as it is being pressurized, wherein cold water (such as at 60 degree F.) can be distributed through the compressor and used as the coolant.

Figure 7:
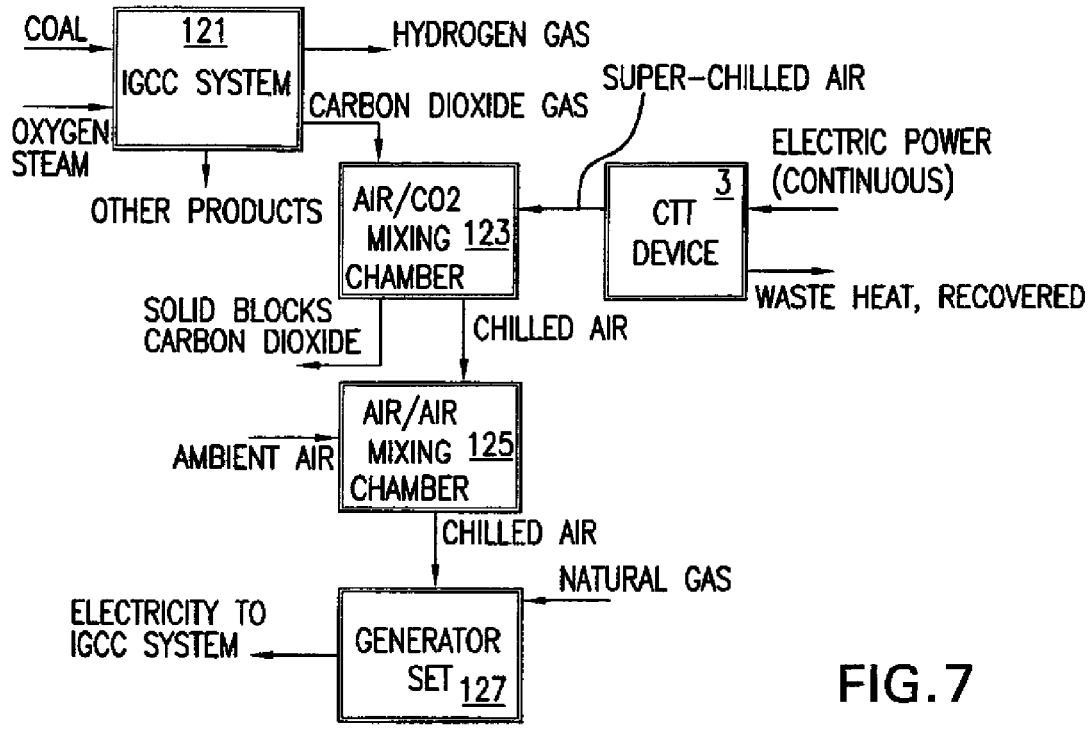
FIG. 7 is a schematic drawing showing how super chilled air generated by the CTT device is mixed with $CO_2$ separated by the IGCC, wherein solid blocks of $CO_2$ are removed from the chamber, and wherein waste heat from the CTT device is recovered, and the remaining chilled air is used as the inlet air for a fuel driven turbine generator.
Figure 8:
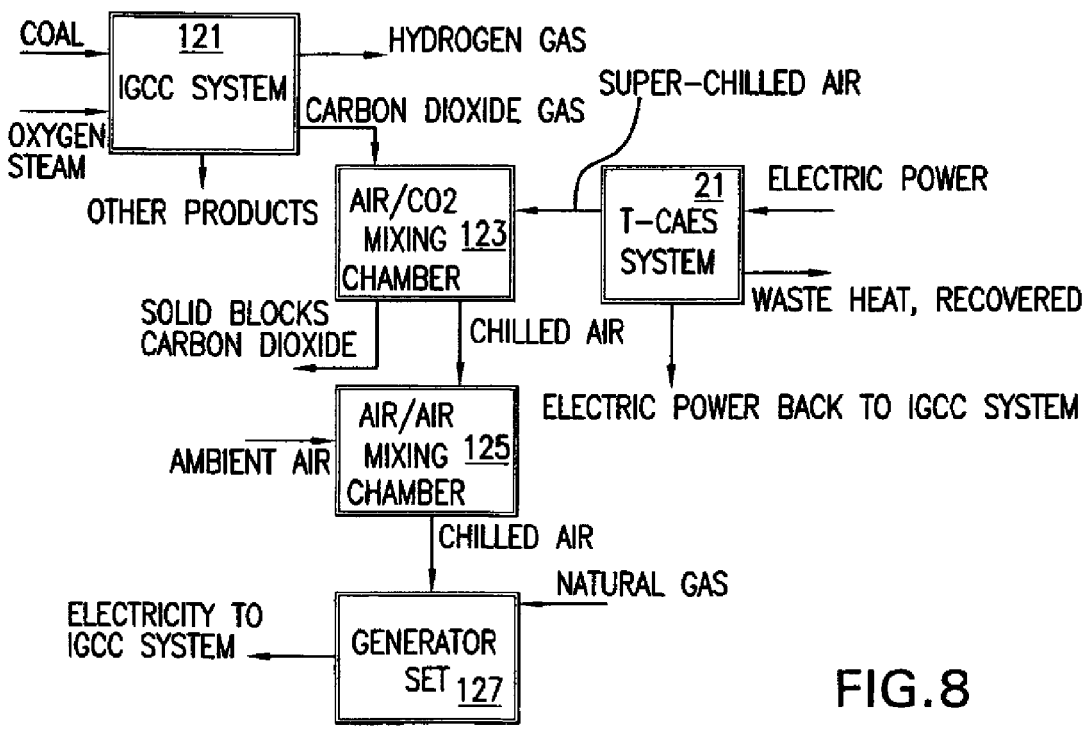
FIG. 8 is a schematic drawing showing how super chilled air generated by the TCAES device is mixed with $CO_2$ separated by IGCC, wherein solid blocks of $CO_2$ are removed from the chamber, and wherein waste heat from the TCAES device is recovered, and the remaining chilled air is used as the inlet air for a fuel driven turbine generator.

FIGS. 7 and 8 schematically show how the various steps are carried out. FIG. 7 shows CTT device 3, and FIG. 8 shows TCAES device 21, wherein $CO_2$ gas is produced by the IGCC system 121, and super chilled air is produced by CTT device 3, or TCAES device 21, as the case may be, and the two are mixed in a mixing chamber 123, wherein solid blocks or cylinders of carbon dioxide can be produced. The left-over chilled air is then transferred to another mixing chamber or inductor 125, and mixed with ambient air, wherein the chilled air can then be used increase the efficiency of a fuel driven turbine generator 127.

The following two examples are provided to show how the present system can be used to not only separate, capture and store $CO_2$ gas from a coal combustion power plant, but to do so in a manner that generates additional energy which can be used to offset the costs associated with separating $CO_2$ from coal using IGCC. The end result is that the performance of the $CO_2$ capture and storage system of the present invention can have a coefficient of performance as high as 1.7 (more power produced than is absorbed from the primary power plant), wherein the efficiency of the system rivals that of a heat pump.

The two examples include: 1) A simple arrangement of the CTT device which demonstrates the simple energy balance and evaluates the power energy required to transform the carbon dioxide gas into compact blocks or cylinders of dry ice, and 2) An example that takes into consideration the details of the expansion process that occurs during the trajectory of the high pressure air through the high rotational speed and expanding cross sectional flutes of the radial impeller blades of the turbo expander, wherein the details of this process will demonstrate that it is possible to use off-the-shelf combinations of turbo compressors and turbo expanders located on a common shaft.

Example One

In a simple version of the proposed solution, the CTT device can be located in close proximity to the coal-combustion plant and use a minimal amount of power from the coal-combustion power plant to drive the CTT compressor. In this respect, FIG. 9 shows the compressor, turbo compressor and turbo expander CTT device with their associated heat exchangers, wherein the chart shows the thermodynamic state for each step in the CTT process.

It is an objective of this device to use two commercially available devices: (1) A gas compressor, and (2) A coupled turbo compressor and turbo expander set as a single CTT device to freeze the carbon dioxide derived from the IGCC. FIG. 9 shows how the power available from the turbo expander (28,772 kW) is appropriately matched to the power required by the turbo compressor (minus 27,859 kW). The chart at the top shows the compressor rating at 27,444 kW. However, there is recoverable waste heat of minus 4,115 kW from the compressor and minus 25,042 kW from the turbo compressor. Thus, if there is a nearby steam-driven GenSet or chiller, there is more power output than input, which is the case with most heat pumps. Furthermore, the 487.6 pounds per second of air at minus 109.3 degrees F. is warmed to 32 degrees F., and the chilling capacity is minus 17,445 kW. Thus, the 27,400 kW input generates minus 4,115 kW, minus 25,042, kW and minus 17,445 kW—or 46,602 kW. Accordingly, this system performs like a typical heat pump wherein the coefficient of performance (C.O.P.) equals 46,602 kW/27,400 kW—or 1.7.

The table in FIG. 9 assumes that it will be necessary to have 30 psia exhaust air to operate with high pressure drop losses in the downstream mixing chamber. Thus the pressure drop from 215 psia to 30 psia can result in producing super chilled air at minus 126 degrees F. However, it is possible to reconfigure the CTT device with a different set of pressures so that the pressure drop from 215 psia to 14.67 psia results in super chilled air at minus 173 degrees F.

FIG. 10 shows that heat balance required by a typical 100 MW power plant that generates 26.53 pounds per second of $CO_2$ requires 487.67 pounds per second of super-chilled air at minus 173 degrees F. FIG. 10 also shows the flow requirements for the CTT device that matches the $CO_2$ effluent of a 100 MW power plant. The cross sectional area requirements for the inlet duct, mixing chamber and outlet ducts are shown in FIGS. 11 and 12.

FIG. 10 shows the calculations and cross section of a mixing chamber with the injection of super-chilled air and room temperature carbon dioxide gas, with the outflow of chilled air and solid blocks of carbon dioxide. As an example, the power plant is rated at 100 MW and uses 7.24 pounds per second of coal (13,100 BTU/POUND heat release). There are 26.53 pounds of carbon dioxide blocks produced. The 27.4 MW of electrical power (FIG. 9) supplied to the compressor drives the turbo compressor and turbo expander to flow 6,417 standard cubic feet per second, SCFS, of air (FIG. 11) with intake air at 70 degree F. to output air at minus 173 degrees F. The minus 173 degrees F. assumes a smaller pressure rise in the feed compressor, and a pressure drop from 215 psia to 14.67 psia.

Furthermore, the air downstream of the mixing chamber is colder than minus 109.3 degrees F. and can be sent to the HVAC system, or to increase the efficiency of a fuel driven turbine generator. In a practical scenario, minor inefficiencies need to be taken into account. There are energies that must be invested at the startup to chill down the hardware, there are losses due to pressure drops, and not all the mixing between the carbon dioxide and air is perfect. Thus, slightly more air needs to be used to assure the freezing of all the carbon dioxide.

Excess super-chilled air is used to assure that the $CO_2$ remains frozen during all the later steps in the handling and shipping of the frozen $CO_2$. The residual exhaust air from the $CO_2$ freezing process is high mass flow at colder than minus 109.3 degrees F. This chilling potential of the residual air flow can be further utilized for cold storage facilities, air conditioning, refrigeration, air intake to a fuel-driven generator set and/or and desalination. Industrial and commercial cold storage facilities can be co-located in the proximity of the coal-burning power plant to enhance the efficiency of the operation.

The size of the duct in which the $CO_2$ flows from the power plant to the mixing chamber and the size of the duct flowing air are calculated in FIG. 11. The room temperature $CO_2$ duct velocity is restricted to no more than 20 ft/sec to avoid excessive pressure drop, then it is necessary to consider 14 pipes, each at one foot in diameter. The bounding duct size choices for the air flow are shown in FIG. 11, including the use of six 10.7 feet diameter or one 18.5 feet diameter ducts to transmit the cold air. This depends upon the real estate available at the site.

Example Two

This example considers the limitations imposed by the compression available across each turbo compressor impeller disc and imposed by the expansion available across each turbo expander impeller disc. In particular, the boundary layer attached to each wall of the fluted vane is limited in terms of pressure ratio before it detaches from the wall. Furthermore, since there is power transfer from the turbo expander to the turbo compressor during its steady state "free spooling" mode, it is necessary to match two sets of turbo expander and turbo compressor combinations, wherein each combination has a separate power rating.

FIG. 13 shows the compressor intake of 14.696 psia and 70 degrees F. ambient air (Point A) to 50 psia and 247 degrees F. compressed air (Point C). The isentropic compression process would have resulted in a higher temperature of 291 degrees F. However, there were temperature drops related to the imperfect compression process and heat transfer to the body of the compressor or 20% of the input power. Coolant water absorbs some of the 10.654 BTU/pound of enthalpy.

When the compressed air is cooled from 247 degrees F. to 70 degrees F., with little pressure drop, 42.87 BTU/pound of enthalpy is available to heat the air. This 50-psia and 70 degrees F. air is available for driving the downstream T/T system. When electrical power is supplied to the compressor, the compressed air from the compressor drives the two stages of turbo compressor and two stages of turbo expander. Note that turbo compressor #1 and turbo expander #1 are hard coupled by a common shaft so that turbo expander #1 drives turbo compressor #1 as it expands the air passing through its impeller. Also note that turbo compressor #2 and turbo expander #2 are hard coupled by a common shaft so that turbo expander #2 drives turbo compressor #2 as it expands the air passing through its impeller.

There are a series of heat exchangers that are available to cool the hot compressed air so that the final expanded air achieves super-chilled states. These heat exchangers transfer their heated water to either the nearby steam-driven generator set or to a heat-driven absorption chiller. FIG. 14 defines the pressure and temperature state for each position. Note that this equilibrium state couples the 35.037 BTU/pound turbo expander to the 35.51 BTU/pound turbo compressor in its free-spooling mode; and the 16.2486 BTU/pound turbo expander to the 16.15 BTU/pound turbo compressor in its free-spooling mode. Further iteration to achieve closer agreement would require estimates of real-world losses. This is sufficient for the initial design.

Also note that in this example the final state delivers the airflow at 24 psia and minus 148.35 degrees F. This excess overpressure compared to ambient will serve to drive the downstream eductor that will entrain the local ambient carbon dioxide gas for mixing to form the dry ice (solid $CO_2$). To specify the kW size of T/T combinations required by the system to the turbo-machinery manufacturer, one can multiply the BTU/pound differences between thermodynamic state points and the pounds/hour of airflow. Then convert the resultant BTU/hour into units of kilowatts. The 135 psia air is compressed and reaches 218 degrees F. (State 2). Coolant water is used to chill the air to 70 degrees F. and the compressed air remains at about 135 psia (State 3). This coolant water is used by nearby steam-driven generator set or absorption chiller.

The 135 psia and 70 degrees F. air is then pressurized to 220 psia and 138 degrees F. with 15% of the energy developed by friction and absorbed by coolant water as waste heat that can be used by nearby steam-driven generator set (GenSet) or chiller. Coolant water is then used to chill the 220 psia and 138 degrees F. air (State 4) to 70 degrees F., which remains at about 220 psia (State 5). This coolant water is used by nearby steam-driven generator set or absorption chiller.

The first stage of expansion in the turbo expander expands the 220 psia and 70 degrees F. to 55 psia and minus 79 degrees F. (State 6) with 15% of the energy developed by friction and absorbed by coolant water as waste heat that can be used by nearby steam-driven generator set (GenSet) or absorption chiller. The second stage of expansion in the turbo expander expands the 55 psia and minus 79 degrees F. to 24 psia and minus 148 degrees F. (State 7) with 15% of the energy developed by friction and absorbed by coolant water as waste heat that can be used by nearby steam-driven generator set (GenSet) or absorption chiller.

This design uses 24 psia as a target pressure so that the exhausting chilled air has sufficient kinetic energy to aspirate the surrounding carbon dioxide gas into a mixing duct (eductor). However, colder air temperatures can be achieved if this design pressure is dropped from 24 psia to 15 psia, although this would require a rebalance of the T/T device.

The rebalance is explained as follows: Note that turbo expander #1 drives the turbo compressor #1 with a required power of 35 BTU/pound. Note also that turbo expander #2 drives turbo compressor #2 with a required power of 16 BTU/pound.

To derive the kilowatts required by the compressor and each of the sets of T/T, one needs only to multiply the required airflow in pounds per second (#/sec) by the difference in enthalpies per unit mass (BTU/#) to derive the BTU/sec or kW ratings.

Figure 15:
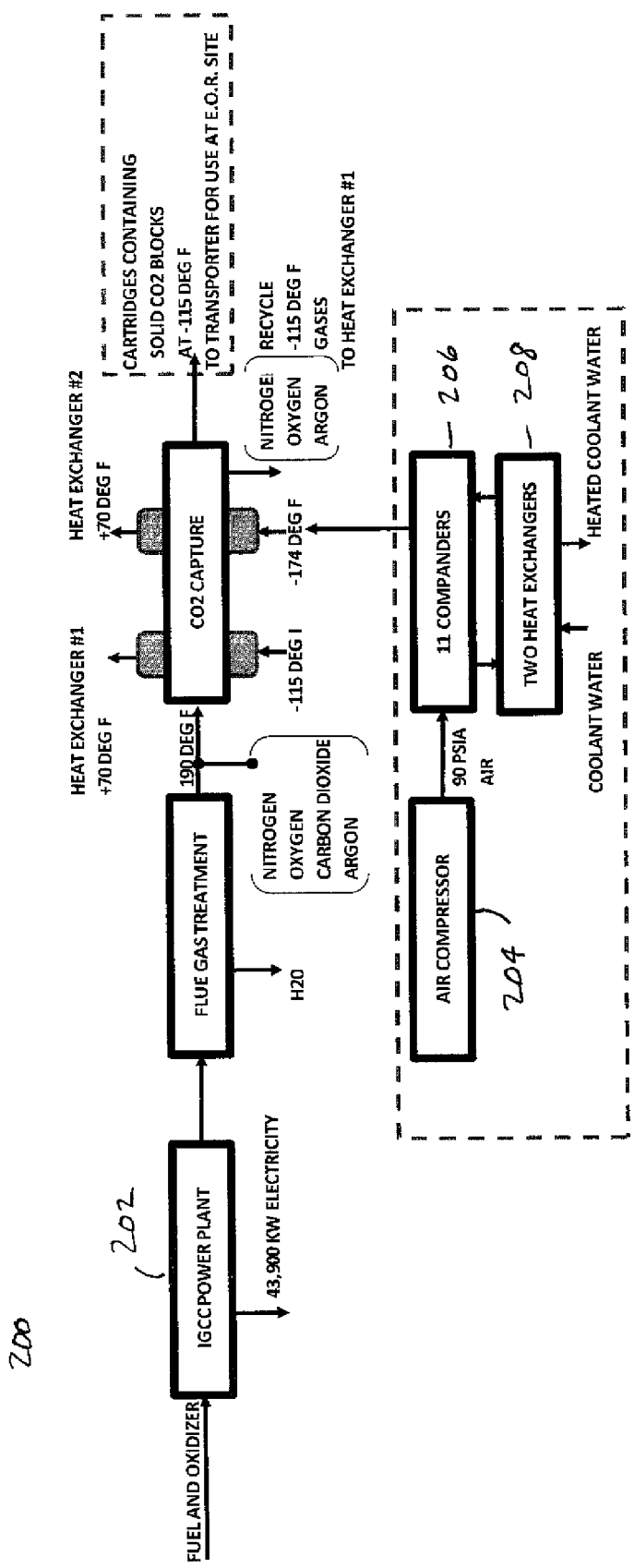
FIG. 15 is a schematic drawing showing an alternative process for removing carbon dioxide gas from coal used in a power plant or flue emissions from the power plant and freezing the carbon dioxide gas using an air compressor and compander device, to form solid carbon dioxide blocks or cylinders.

FIG. 15 shows another embodiment 200 involving the capture of $CO_2$ gas from the flue gases of an existing power plant 202, wherein the captured $CO_2$ gas is treated and introduced into a chamber 201 (shown in FIG. 16) along with super chilled air to produce frozen carbon dioxide crystals that can be agglomerated and shaped into blocks or cylinders. In this embodiment, the chilled air is preferably produced using an air compressor 204 and associated compander set 206, along with two heat exchangers 208, using water as the coolant, wherein the expansion of the compressed air produces super chilled air at temperatures sufficient to flash freeze the carbon dioxide gas in the chamber. The numerical data included in these figures are for exemplary purposes only and shall not be construed as limitations to the scope of Applicant's invention.

FIG. 16 provides additional details of the embodiment shown in FIG. 15, wherein the $CO_2$ gas captured from the flue emissions of a power plant 202 is introduced into mixing chamber 201 under pressure such that it flows into the chamber substantially horizontally. And as the $CO_2$ is injected into the chamber, super chilled air from the compressor 204 and compander device 206 is injected into the chamber simultaneously, wherein the $CO_2$ begins to flash freeze to form tiny ice crystals, i.e., in a dead air zone within chamber 201. And because of the pressure applied to the $CO_2$ gas as it is being injected into the chamber, the frozen crystals are forced substantially horizontally into and through the chamber, toward the far end, which allows the crystals to agglomerate together within the chamber to form the desired shape.

C. Forming Frozen Carbon Dioxide Blocks or Cylinders.

In the embodiment of FIG. 4, the bottom of the chamber is preferably provided with a screw that helps to push the agglomerated crystals down through a portal leading to a conveyor system that helps to form the ice blocks. The conveyor preferably has frames or molds that are intermittently spaced apart with a flexible belt so that as the conveyor rotates, the ice blocks can be formed and released. It has been found that it is desirable for the crystal mass at the bottom of the chamber to remain at slightly lower than the freezing temperature of $CO_2$, such that the dry ice blocks will remain frozen while they are being deployed. Accordingly, it is desirable to control the temperature of the super chilled air inside the chamber as well as the temperature of the $CO_2$ gas, and the rate of introduction of each, to obtain the optimum results.

It should be noted that the $CO_2$ ice blocks need to be kept at a temperature of less than minus 109.3 degrees F., since above that temperature, the ice will begin to melt and change phase, i.e., it will transform directly from a solid to a gas (hence the name dry ice). When compressed, one cubic feet of dry ice equals 93.65 pounds of carbon dioxide, whereas, in gaseous form, the same amount (poundage) of $CO_2$ would take up more than 17,657.3 cubic feet. Thus, it can be seen that from a cost and efficiency standpoint it is desirable to compress the $CO_2$ gas, and form dry ice blocks, wherein the ice can then be easily transported and used.

In the embodiment shown in FIG. 16, as the frozen $CO_2$ crystals accumulate at the far end of chamber 201, the agglomerated block of frozen $CO_2$ formed can be pushed through an opening 210 located at the far end of the chamber, wherein a trap door 212 is preferably provided that allows the blocks of $CO_2$ ice to drop onto a conveyor 214 below. In this case, the mechanism that allows the $CO_2$ blocks to drop is preferably a wheel 216 with multiple molds 218 thereon, wherein each mold 218 has a predetermined shape sufficient to form one block or cylinder of ice, wherein each mold is preferably positioned on wheel 216, such that, as soon as one mold is filled with frozen $CO_2$ to form one block, the wheel can be rotated, such that the next mold can be lined up with chamber 201, to allow another frozen $CO_2$ block or cylinder to be formed in the next adjacent mold. The wheel can then be rotated to allow each new $CO_2$ block or cylinder to be formed, and this process can be repeated, allowing each successive mold 218 to be filled with $CO_2$, to form additional blocks, etc.

In such case, each mold 218 preferably has its own trap door 212 such that after each block is formed, and the wheel 216 is rotated, the blocks can be emptied from the mold and onto conveyor 214. A vent with a shaft is preferably extended from chamber 201 that allows excess chilled gases in the chamber to be emptied out, wherein the gases can be re-circulated back into the supply side, such that it can be re-used with the injection of $CO_2$ gas into chamber 201 during the next cycle.

FIG. 17 shows another configuration for chamber 201 which can be used in connection with the embodiment of FIG. 16, wherein the far end of chamber 201 can be configured to have a cartridge 220 or mold that is in the shape of a cylinder, such that, as the $CO_2$ gas is flash frozen and changes phase to form tiny ice crystals, and as the crystals are pushed down toward the far end by the pressurized carbon dioxide gas, they will agglomerate together within cartridge 220, wherein the block or cylinder of frozen $CO_2$ will begin to take shape. Then, as pressure continues to build inside chamber 201, by virtue of more $CO_2$ gas being injected into chamber 201, more crystals will be forced down toward the far end, wherein more crystals will continue to agglomerate inside cartridge 220, until the entire cartridge is filled, wherein an elongated cylindrically-shaped frozen carbon dioxide block can be formed inside the cartridge.

Multiple cartridges 220 are preferably positioned on a rotating wheel, similar to the one discussed in connection with FIG. 16, wherein each cartridge has a predetermined shape sufficient to form one block or cylinder of ice crystals, and wherein, each cartridge is preferably positioned on the wheel such that, as soon as one cartridge is filled, to form one frozen $CO_2$ cylinder or block, the wheel can be rotated, such that the next cartridge can be lined up with the chamber, to allow another frozen $CO_2$ cylinder or block to be formed inside the next cartridge in the wheel. The wheel can then be rotated to allow each new $CO_2$ cylinder or block to be formed, and this process can be repeated, filling each successive cartridge with $CO_2$, to form additional cylinders or blocks, etc.

The diameter of cartridge 220 is preferably predetermined and is preferably slightly less than the diameter of the existing injection pipe of the abandoned oil well, such that the $CO_2$ cylinder can easily slide down into the injection pipe, but substantially fill the volume of air inside the pipe, wherein the cylinders can drop through the pipe with little or no friction, i.e., such that they slide the way down from the top to the bottom, by gravity alone. In such case, an adequate gap is preferably provided between the cylinder and pipe to allow the cylinders to move freely down through the pipe, which can be accomplished by making the diameter of the cylinder at least about one-quarter inch less than the diameter of the pipe.

As for the length of the cartridge and therefore the cylinder, this will depend on the characteristics of the particular oil well that is being used, wherein in some cases, it may be desirable to form relatively short cylinders and in other cases it may be desirable to form relatively long cylinders. Using relatively short cylinders can make handling and transportation easier, while at the same time, it may be easier and less time consuming and therefore less labor intensive if long cylinders are used, so that only a single cylinder would have to be lifted and dropped into the injection pipe, rather than having the drop multiple small cylinders. Cylinders having a particular length can also be created and used, such as when it is desirable to optimize the filling of the pipe inside the oil reservoir, depending on the size and shape of the reservoir.

In the embodiment shown in FIG. 17, cartridge 201 is preferably designed to be 84 feet long and 8 inches in diameter, and with the appropriate $CO_2$ gas pressure, while the cylinders are being formed, it may take up to about one minute or more for the frozen $CO_2$ crystals to fill the entire length of the cartridge, from one end to the other. Then, once one cartridge is filled, the wheel can be rotated such that the next cartridge can be lined up with the chamber, wherein that next cartridge can then be filled with frozen $CO_2$ to form the next cylinder, etc. In each case, after one cartridge is filled, the wheel is preferably rotated such that each cylinder can be released and dropped onto a conveyor below. Note: because of the length of the cylinders, it may be desirable to keep the cylinders inside the cartridges, especially while the cartridges are being transported, which can help protect the cylinders from cracking or breaking, etc. In such case, the cartridges are preferably detachable from the wheel and able to be recycled, so that they can be reused again, after they are used in one cycle. Otherwise, new cartridges will have to be provided in conjunction with each new wheel used.

Figure 18:
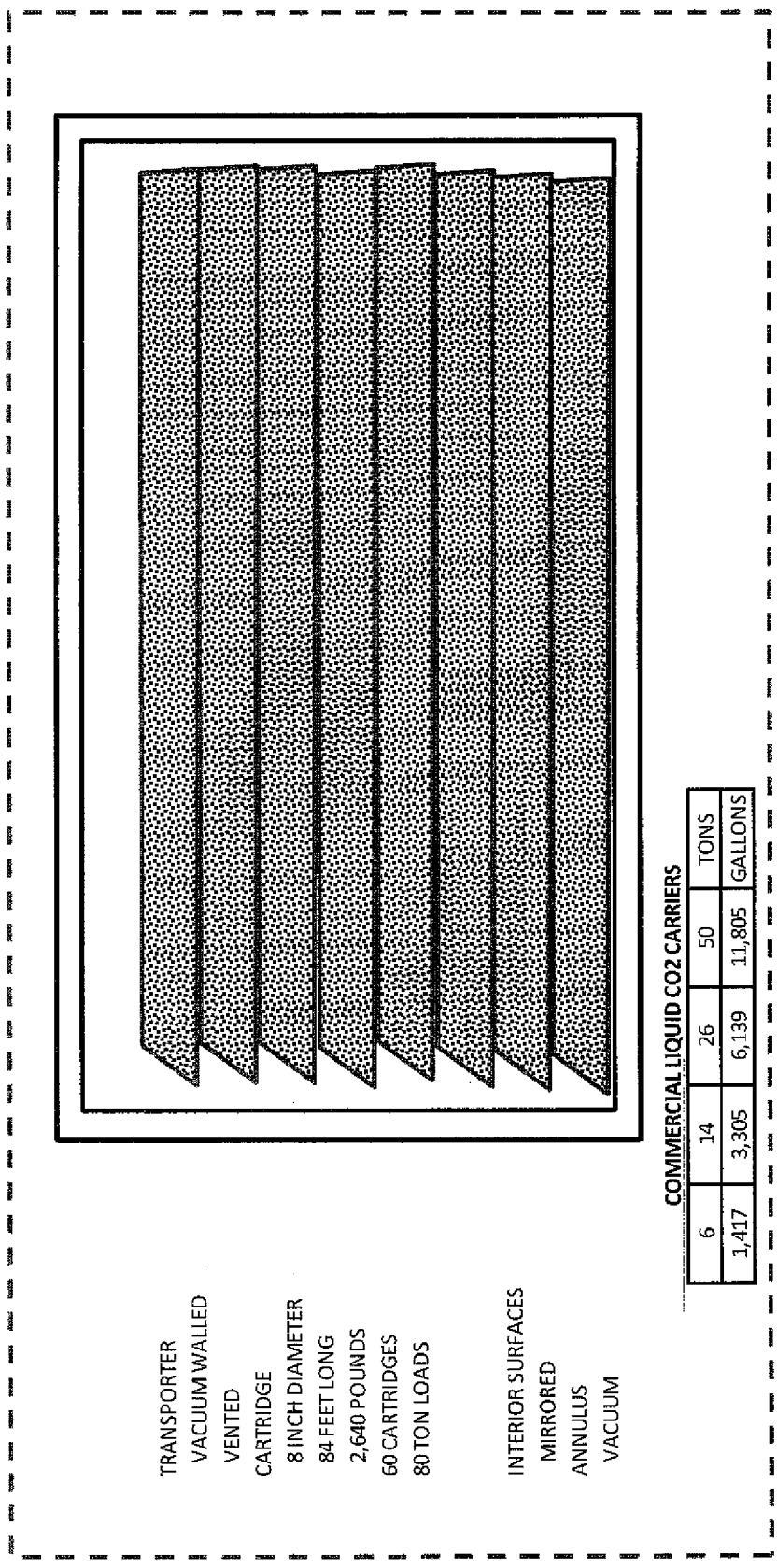
FIG. 18 is a schematic drawing showing a container for transporting the frozen carbon dioxide cylinders.

D. Transporting Blocks and Cylinders to the Site:

The next step involves transporting the $CO_2$ ice blocks or cylinders to the abandoned oil well site, such as by refrigerated truck or rail, and then using a lifting device, such as a crane, to lift and drop the blocks or cylinders down into the existing injection pipe that leads down into the abandoned underground oil reservoir. FIG. 18 shows how multiple elongated frozen $CO_2$ cylinders can be stacked and transported in an insulated container comprising vacuum walls.

When cylinders that are housed in cartridges are used, at the appropriate time, such as when the cartridges have been transported and delivered to the site, a crane is preferably used to lift and turn each cartridge upside down, over the injection pipe, wherein the frozen cylinder of $CO_2$ can then be dropped from the cartridge and down into the injection pipe, such as by gravity alone. In cases where the cylinders are stuck and won't come out, the cartridges can be adapted with heating coils or other heating mechanism that allows the cartridges to be heated up, so that the frozen cylinders will easily slide out and drop down into the injection pipe.

E. The First Application—Releasing Carbon Dioxide Gas Under Pressure Directly into the Liquid Oil Matrix.

Figure 19:
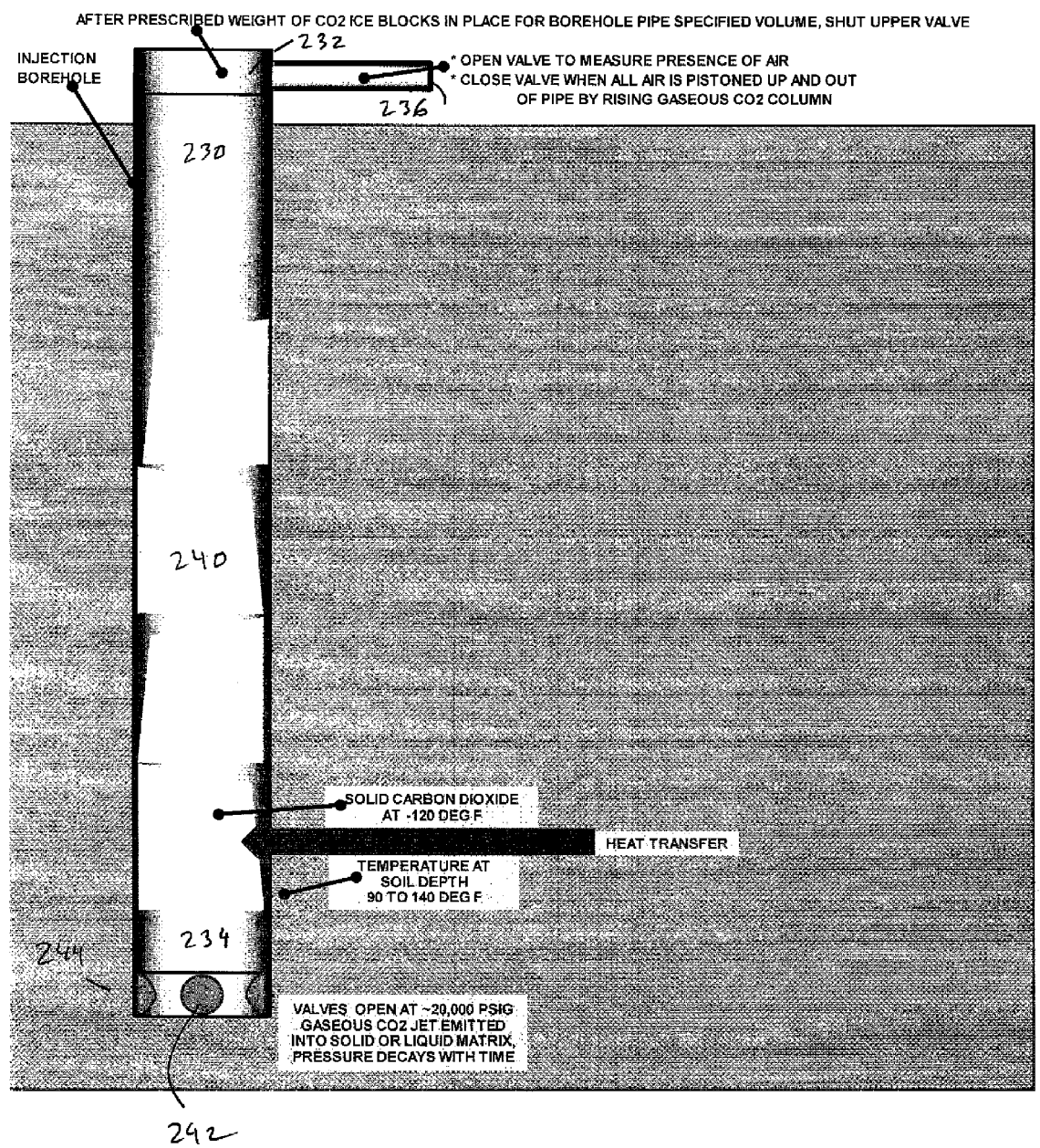
FIG. 19 is a schematic drawing showing an existing injection pipe at an abandoned oil reservoir site, wherein the pipe extends down into the abandoned oil reservoir, and wherein shutoff valves have been provided at the top and bottom of the pipe, and the frozen carbon dioxide cylinders have been dropped down into the pipe, such that with both sets of valves closed, the solid carbon dioxide gas is trapped in the pipe, wherein as the ice warms up and sublimates, the solid changes phase to a gas, thereby causing the air pressure inside the pipe to increase, such that, when the bottom valves are opened, pressurized carbon dioxide gas is emitted through openings into the liquid oil matrix, wherein the carbon dioxide gas mixes vigorously with the oil (this is referred to as the "first application")

In cases where the existing injection pipe located at the abandoned oil reservoir extends all the way down into the liquid oil matrix itself, i.e., with multiple perforations extended on the bottom of the pipe, which communicate directly with the oil, the first application can be used. In the first application, the first step involves evaluating the existing injection pipe 230 and as necessary adapting and retrofitting the pipe by adding shutoff valves at the top 232 and bottom 234, as shown in FIG. 19. Of course, if the existing injection pipe already has valves, either at the top and/or bottom, no further adaptation may be necessary, provided that the existing valves are in good condition and can be operated successfully with significant built-up pressure inside the pipe.

Once the shutoff valves have been installed, and once the appropriately sized number of frozen carbon dioxide blocks or cylinders have been transported to the site, the next step involves dropping the frozen blocks or cylinders 240 into the injection pipe with the bottom valves 234 closed, using a crane or other method, as discussed above. This normally involves first determining the diameter and depth of the injection pipe, and calculating how many blocks or cylinders of $CO_2$ will be needed to substantially fill the volume of space inside the pipe, which involves calculating the amount of pressure that would be created by filling the pipe, and allowing that volume of carbon dioxide to change phase from a solid to a gas, which can help maximize its effectiveness. This can be done, for example, by calculating the mass and weight of the blocks or cylinders 240 and/or measuring their overall size and dimensions, etc., and determining the temperature of the space inside the pipe, and how many blocks or cylinders will be needed to create the necessary air pressure within the pipe, etc.

Initially, a predetermined number of $CO_2$ blocks or cylinders 240 are preferably dropped down into the injection pipe 230 where the temperature of the underground rock formation can range from about 90 degrees to 140 degrees F., or higher, depending on the location. Thus, once a sufficient number of blocks or cylinders 240 have been inserted into the injection pipe, with the valve at the bottom 234 closed, the ice will begin to sublimate and change phase from a solid to a $CO_2$ gas, wherein the gas will begin to expand and rise. By subjecting the $CO_2$ blocks or cylinders to these higher temperatures, the frozen $CO_2$ will begin to sublimate and change phase to form a gaseous $CO_2$ or $GCO_2$, which will continue until the pipe is filled.

Note that once a sufficient number of carbon dioxide blocks or cylinders have been introduced into the pipe, it will be desirable to remove as much of the ambient air as possible, so that the carbon dioxide gas inside the pipe will be relatively pure. This can be accomplished by providing a sensing device 236 at the top of the pipe which measures the content of the air, such that, as the frozen carbon dioxide blocks or cylinders begin to warm up and change phase to a gas, and as the carbon dioxide gas begins to rise, the sensing device will be able to detect when the column of carbon dioxide gas has reached the top, and to shut the top valves at the appropriate time. At this point, the top valve 232 of the injection pipe 230 is preferably left open to allow the vertical column of ambient air inside the injection pipe to rise as the $CO_2$ ice continues to expand to a gas. Then, using the monitor 236 located at or near the top to determine the content of the rising air, when all of the ambient air has risen and some of the $CO_2$ gas begins to be detected, the top valve is preferably closed. The monitor 236 preferably detects when all the ambient air and some of the $CO_2$ gas has risen to the surface.

With the top valve 232 closed, the $CO_2$ blocks or cylinders 240 inside the injection pipe 230 are preferably allowed to warm up and sublimate and change phase to a gas, and over time, due to the expansion of the solid to a gas, the pressure inside the injection pipe will begin to build, i.e., without the use of high pressure $CO_2$ compressors. When the internal pressure within the injection pipe reaches a sufficient amount, which can be between 8,500 to 9,000 psig, or even higher, such as 20,000 psig, depending on the circumstances, the pressure within the injection pipe will be sufficient to enable jet streams of $CO_2$ gas to be released under high pressure through the perforations 242 on the pipe, into the liquid oil matrix, with sufficient velocity to cause the gas to mix and stir vigorously with the oil.

Note that the perforated portion of the injection pipe (with small diameter perforations 242) preferably extends into and communicates directly with the liquid oil matrix, and therefore, at the appropriate time, when the bottom valves 234 are opened and the trapped $CO_2$ gas is released into the liquid oil matrix, jet streams of gas are emitted into the oil reservoir under high pressure and velocity to cause the oil to mix with the gas. In such case, a separate pressure monitor 244 is preferably provided on the injection pipe near the bottom to determine when the appropriate amount of pressure has been reached inside the pipe, which triggers the opening of the bottom valve 234. Then, as the $CO_2$ gas is released through the perforations 242, the carbon dioxide gas will mix vigorously with the oil, causing the oil to react with the gas, wherein the oil will eventually swell and become lighter and less viscous, such that it can be more easily pumped out using conventional equipment.

Then, once the pressure reaches a predetermined amount, which is preferably about 100 psig, the bottom valve 234 is once again closed, since at that point, the pressure in the pipe will be insufficient to cause rapid movement of $CO_2$ gas sufficient to cause it to mix with the oil.

Additional recovery pipes (not shown but similar to the injection pipes) can be constructed that are extended down into the existing reservoir, which will enable the lower viscous oil that flows through the reservoir to be pumped out. On the other hand, the existing injection pipe can be adapted and converted into a recovery pipe, wherein in such case, the valves 232 at the top and bottom 234 can be kept open, such that the lower viscous oil can then be drawn out of the reservoir, i.e., in a reverse direction, upward through injection pipe 230, to the surface, where it can be recovered.

By forcing the high pressure $CO_2$ gas into the liquid oil matrix via a vertical injection pipe 230 with an end extension of perforations 242, the high pressure $CO_2$ vented through the perforations can be used to stir and mix the $CO_2$ gas with the oil, wherein by positioning the openings 242 in multiple radial directions, the high pressure $CO_2$ can be directed into the reservoir in a manner that can help increase the scope and coverage of the mixing effect caused by the carbon dioxide gas.

In another aspect, injection pipe 230 can be adapted with a rotating sleeve (not shown) at the bottom where the perforations 242 are located, such that, with each cycle, the perforations 242 can be aimed in different directions within the matrix, thereby allowing for greater coverage of the emitting gas, which in turn, can help increase the scope and effective area of coverage reached by the enhanced oil recovery method.

Since the pressure inside the pipe 230 will decrease quickly as the pressurized carbon dioxide gas is released, the preferred method contemplates that it may be necessary to repeat these steps several times, as necessary to reduce the viscosity of the remaining oil in the reservoir. For example, once the pressure is normalized, the bottom valves 234 can be closed and the top valves 232 can be reopened, wherein additional carbon dioxide blocks or cylinders can be introduced into the pipe 230, and the same process can begin again.

While the temperature of the frozen blocks or cylinders 240 must remain at or below minus 109.3 degrees F. for the carbon dioxide to remain frozen, i.e., in a solid state, the temperature inside the underground space within the pipe is ordinarily much higher, i.e., in a typical oil well, the temperature of the ambient air and the surrounding pipe can be anywhere from 90 to 140 degrees F. or even higher. Thus, as soon as the frozen blocks or cylinders are dropped into the pipe, they will begin to melt and change phase from a solid to a gas. Heat transfer can also occur between the relatively warm surface of the injection pipe, which is surrounded by the warm underground earth, and the frozen blocks or cylinders, which will continue to cause the solid carbon dioxide to change phase to a gas. And, because both the top 232 and bottom 234 valves are closed, and the space inside the injection pipe 230 is sealed, as the solid carbon dioxide changes phase to a gas, the pressure within the injection pipe will dramatically increase.

Lastly, as the remaining oil is being pumped out and recovered at the surface, means are preferably provided to capture the carbon dioxide gas that is being released through the injection and/or recovery pipes, such that it will not be emitted into the atmosphere. In such case, a closed-loop system is preferably used, wherein the carbon dioxide gas captured at the surface can be recycled back and reused to create additional frozen carbon dioxide ice blocks or cylinders, wherein these steps can be repeated multiple times.

F. The Second Application—Dropping Frozen Carbon Dioxide Cylinders Directly into the Liquid Oil Matrix.

As shown in FIG. 20, the second application is appropriately used in cases where the oil level 254 in the reservoir 256 falls below the bottom 251 of the existing pipe 252, such that there is no direct communication between the pipe and the liquid oil matrix. This can occur, for example, when the reservoir 256 has already undergone the first and second production phases, and a significant percentage of the oil in the reservoir has already been extracted, thereby dropping the level of the oil 254 in the reservoir below the pipe 252. This typically results in having the bottom end 251 of the pipe 252 hanging down into the airspace 253 inside the dome of the reservoir, i.e., below the capstone 262, but above the surface 254 of the oil 255, as shown in FIG. 20.

Note that this second application can be used independently from the first application, or it can be used in conjunction with and following the first application, such as when the oil level starts out above the bottom of the pipe before the first application is used, but drops below the bottom of the pipe after the first application is applied. Also note that with the second application, the existing pipe does not have to be adapted or retrofitted with valves, either at the top or bottom, since this application involves no pressurization of the volume of space inside the injection pipe.

Once the appropriately sized number of frozen carbon dioxide cylinders have been transported to the site, the next step involves introducing the frozen cylinders 250 into the injection pipe 252, one by one, such as by lifting them with a crane, etc., as discussed previously. Prior to this step, it will be desirable to determine the diameter and length of the injection pipe 252, and estimate the volume and depth of oil in the reservoir, and calculating how many cylinders 250 will be needed to achieve the desired results, which is to maximize the stirring and mixing effect of the carbon dioxide gas bubbles 260 in the liquid matrix 255, to cause as much of the remaining oil in the reservoir to react with the carbon dioxide gas as possible, which in turn, can help maximize the amount of lower viscous oil that can be pumped out using conventional pumping equipment.

When the frozen cylinders 250 are dropped down into the injection pipe 252, they typically slide and free-fall down through the pipe by gravity alone, until they splash down into the liquid oil matrix 255, which begins the process of mixing the carbon dioxide gas with the oil. As soon as cylinders 250 strike the warmer temperature oil, the carbon dioxide will begin to warm up and sublimate and change phase from a solid to a gas, wherein violent gas bubbles 260 will begin to form within the liquid oil matrix 255, which helps to vigorously mix the carbon dioxide gas with the oil, which in turn, causes the oil to swell, and lighten, and therefore, become less viscous, thus allowing it to flow more freely and detaching itself from the rock formations, and therefore, it will become easier to pump out using conventional pumping equipment.

Then, as the carbon dioxide gas bubbles 260 continue to form, the frozen cylinders 250 will tend to be propelled by the emission of gases from the surface of the cylinders. Then, as the cylinders sink toward the bottom 264 of the reservoir 256, i.e., due to their higher density, they will continue to warm up, and the cylinders will continue to emit gases that will continue to mix vigorously with the remaining oil. Then, as the cylinders 250 continue to sink, and as the cylinders are propelled by the emission of carbon dioxide gas bubbles 260 in different directions, this in turn helps increase the scope of the reaction taking place between the gas and oil, and thus, increase the coverage and effectiveness of the process. This preferably occurs until all the frozen carbon dioxide has sublimated, i.e., turned to a gas, and as much of the oil has reacted with the carbon dioxide gas, to reduce the viscosity thereof.

As with the first application, additional recovery pipes (not shown) can be constructed and extended into the reservoir 256, and into the oil matrix 255, which will enable the lower viscous oil that flows through the reservoir to be pumped out to the surface using conventional equipment. Or, the injection pipe can be converted and used as the recovery pipe, wherein the oil will flow in a reverse direction, i.e., upward, through the pipe and to the surface.

In either application, the system is preferably a closed-loop system, wherein the carbon dioxide gas that rises to the surface through the pipes (either injection or recovery) is captured and reused to create additional frozen carbon dioxide ice blocks or cylinders. This can be accomplished, for example, by providing a pump at the top of the pipes (both injection and recovery pipes) and drawing the excess carbon dioxide gas that rises to the surface, wherein a network of pipes can be provided to recycle the carbon dioxide gas to a compressor, which can then be used to compress the carbon dioxide gas inside pressurized containers, which can then be transported back to where the frozen carbon dioxide blocks or cylinders are being produced.

These steps can be repeated multiple times.

What is claimed is:

1. A system for recovering oil from an existing underground oil reservoir, where viscosity of existing oil in the existing underground reservoir is too high to enable it to be extracted using conventional equipment, comprising:
    a chamber for mixing carbon dioxide gas with super chilled air to produce frozen carbon dioxide crystals;
    an apparatus for agglomerating the carbon dioxide crystals to form frozen carbon dioxide blocks or cylinders;
    a transporter for transporting the frozen carbon dioxide blocks or cylinders to said existing underground oil reservoir;
    dropping the blocks or cylinders into said existing underground oil reservoir;
    the frozen carbon dioxide blocks or cylinders contacting the existing oil in said existing underground oil reservoir;
    the frozen carbon dioxide blocks or cylinders changing phase to a gas inside said existing oil causing release of carbon dioxide gas;
    a recovery pipe that extends into the existing underground oil reservoir to pump the existing oil up to the surface, wherein the carbon dioxide gas rises to the surface to be recycled and reused to create additional frozen carbon dioxide blocks or cylinders, and
    wherein the released carbon dioxide gas forms carbon dioxide bubbles that mix vigorously within the existing oil in the reservoir, wherein the carbon dioxide bubbles lower the viscosity of the existing oil, and wherein the existing oil is then extracted using conventional pumping equipment.

2. The system of claim 1, wherein an injection pipe is extended down toward the existing underground oil reservoir, wherein the bottom of the injection pipe terminates above the surface level of the existing oil in the existing underground oil reservoir, wherein the frozen carbon dioxide blocks or cylinders are dropped into the injection pipe such that they fall into the existing oil, wherein the warm temperature of the existing oil helps to cause the frozen carbon dioxide blocks or cylinders to change phase from a solid to a gas, wherein the carbon dioxide bubbles that are created thereby mix vigorously with the existing oil in the reservoir.

3. A method of recovering oil from an existing oil reservoir where the viscosity of existing oil in the existing oil reservoir is too high to enable it to be extracted using conventional equipment, comprising:
    separating carbon dioxide gas from coal used in a power plant and/or flue emissions from said power plant;
    mixing the carbon dioxide gas with super chilled air in a chamber to produce frozen carbon dioxide crystals;
    allowing the carbon dioxide crystals to agglomerate and forming ice blocks or cylinders with the frozen carbon dioxide crystals;
    transporting the ice blocks or cylinders to the existing reservoir and dropping them into the existing oil in said reservoir;
    allowing the blocks or cylinders to change phase to a gas within the existing oil and causing the carbon dioxide gas to form bubbles that mix vigorously with the existing oil in the reservoir, which in turn, helps lower the viscosity of the existing oil and makes it easier to extract using conventional equipment;
    producing compressed air with at least one compressor; and
    releasing the air with at least one expander, wherein super chilled air is produced as a by-product thereby, and wherein the carbon dioxide gas crystallizes in a dead air zone within the chamber and begins to agglomerate, wherein after the super chilled air is allowed to mix with the carbon dioxide gas to form the crystals, the air in said chamber is directed through a side duct extending along the side of said chamber, wherein the remaining chilled air can be used to provide cooling for HVAC, refrigeration, air intake to a fuel-driven generator set and/or desalination.

4. The method of claim 3, wherein the method further comprises using a screw to push the agglomerated carbon dioxide crystals collected at the bottom of said chamber through a portal and allowing the agglomerated crystals to fall into a mold or other structure which helps to form the ice blocks into cylindrical shapes.

5. A method of recovering oil from an existing oil reservoir where the viscosity of existing oil in the reservoir is too high to enable it to be extracted using conventional equipment, comprising:
    separating carbon dioxide gas from coal used in a power plant and/or flue emissions from said power plant;
    mixing the carbon dioxide gas with super chilled air in a chamber to produce frozen carbon dioxide crystals;

allowing the carbon dioxide crystals to agglomerate and forming ice blocks or cylinders with the carbon dioxide crystals;

transporting the ice blocks or cylinders to the existing reservoir and dropping them into the existing oil in said reservoir;

allowing the blocks or cylinders to change phase to a gas within the existing oil and causing the carbon dioxide gas to form bubbles that mix vigorously with the existing oil in the reservoir, which in turn, helps lower the viscosity of the existing oil and makes it easier to extract using conventional equipment;

providing a recovery pipe that extends into the reservoir to pump the existing oil in the reservoir up to the surface;

allowing excess carbon dioxide gas to rise and come to the surface; and recycling and reusing the carbon dioxide to create additional blocks or cylinders of frozen carbon dioxide.

6. The method of claim 5, wherein an injection pipe is extended down toward said reservoir and terminates above the surface level of the existing oil, and wherein the method comprises dropping the blocks or cylinders into the injection pipe such that they fall directly into the existing oil in the reservoir, and allowing the relatively warm temperature of the existing oil to cause the blocks or cylinders to change phase from a solid to a gas, wherein the bubbles that are formed within the existing oil, vigorously mix with the existing oil in the reservoir.

7. A method of recovering oil from an existing underground oil reservoir where the viscosity of existing oil in the existing underground reservoir is too high to enable it to be extracted using conventional equipment, comprising:

a. agglomerating carbon dioxide crystals into one or more blocks or cylinders, wherein the carbon dioxide crystals are formed using a method comprising the steps of:
  i. separating carbon dioxide gas from a power plan exhaust system;
  ii. super chilling the separated carbon dioxide gas, wherein the super chilled carbon dioxide gas forms the carbon dioxide crystals; and
  iii. forming the one or more blocks or cylinders from the carbon dioxide crystals;

b. dropping the one or more blocks or cylinders into the existing oil reservoir;

c. the one or more block contacting existing oil within the existing oil reservoir;

d. the existing oil heating the one or more blocks or cylinders, wherein the one or more blocks or cylinder undergo a phase change from a solid to a gaseous state releasing the carbon dioxide gas e. the released carbon dioxide gas mixing with the existing oil, wherein a viscosity of the existing oil is reduced, wherein the reduced viscosity facilitates extraction of the existing oil;

f. extracting the existing oil from the reservoir; and g. recycling excess carbon dioxide gas, wherein a recovery pipe directs excess carbon dioxide gas within the reservoir, wherein the excess carbon dioxide gas is used in the step of agglomerating the carbon dioxide crystals.

* * * * *